US006995923B2

(12) United States Patent
Noda

(10) Patent No.: US 6,995,923 B2
(45) Date of Patent: Feb. 7, 2006

(54) SMALL LIGHTWEIGHT ZOOM LENS

(75) Inventor: Takayuki Noda, Saitama (JP)

(73) Assignee: Fujinon Corporation, Saitama (JP)

( * ) Notice: Subject to any disclaimer, the term of this patent is extended or adjusted under 35 U.S.C. 154(b) by 52 days.

(21) Appl. No.: 10/874,717

(22) Filed: Jun. 24, 2004

(65) Prior Publication Data
US 2004/0263997 A1 Dec. 30, 2004

(30) Foreign Application Priority Data
Jun. 30, 2003 (JP) ............................. 2003-187405

(51) Int. Cl.
G02B 15/14 (2006.01)
(52) U.S. Cl. ..................................... 359/689; 359/680
(58) Field of Classification Search ........ 359/680–683, 359/686, 689
See application file for complete search history.

(56) References Cited

U.S. PATENT DOCUMENTS 5,539,582 A * 7/1996 Kohno et al. ............... 359/689
5,781,348 A * 7/1998 Ohtake ....................... 359/676

FOREIGN PATENT DOCUMENTS

| JP | H05-164965 | 6/1993 |
|---|---|---|
| JP | H05-323190 | 12/1993 |
| JP | H06-148518 | 5/1994 |
| JP | H06-289290 | 10/1994 |
| JP | H07-281093 | 10/1995 |
| JP | H09-184979 | 7/1997 |
| JP | H11-23966 | 1/1999 |
| JP | 2000-330019 | 11/2000 |
| JP | 2002-14285 | 1/2002 |

* cited by examiner

Primary Examiner—Georgia Epps
Assistant Examiner—M. Hasan
(74) Attorney, Agent, or Firm—Arnold International; Jon W. Henry; Bruce Y. Arnold

(57) ABSTRACT

A zoom lens includes three lens groups. The first lens group from the object side has negative refractive power and is formed of one or two lens components. The second lens group from the object side has positive refractive power and is formed of one lens component. The third lens group from the object side has negative refractive power, is formed of one lens component, and is moveable for focusing. Both the second and third lens groups move for zooming. A stop is arranged in the second lens group on the object side thereof. Two lens surfaces of each lens group are aspheric. Each lens component may be a lens element and all lens elements may be made of plastic. The zoom lens may be formed of only the three lens groups and satisfies specified conditions to assure that the zoom lens is small, lightweight, and favorably corrects various aberrations.

20 Claims, 12 Drawing Sheets

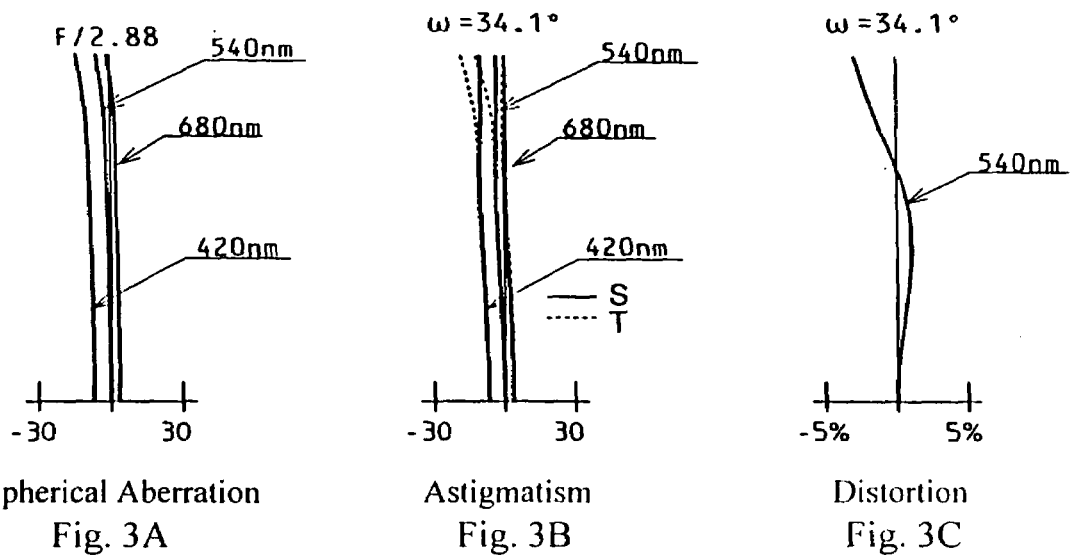
Spherical Aberration
Fig. 3A
Astigmatism
Fig. 3B
Distortion
Fig. 3C
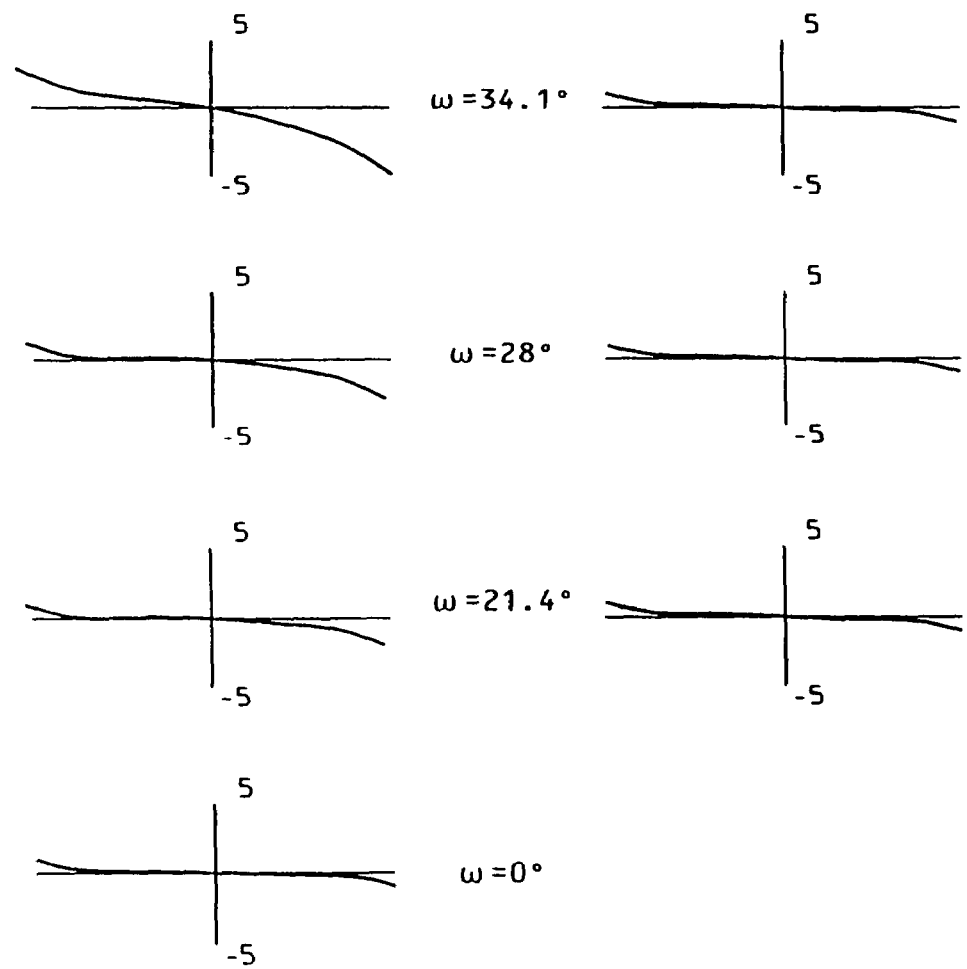
Fig. 3D Spherical Aberration Astigmatism Distortion Spherical Aberration Astigmatism Distortion

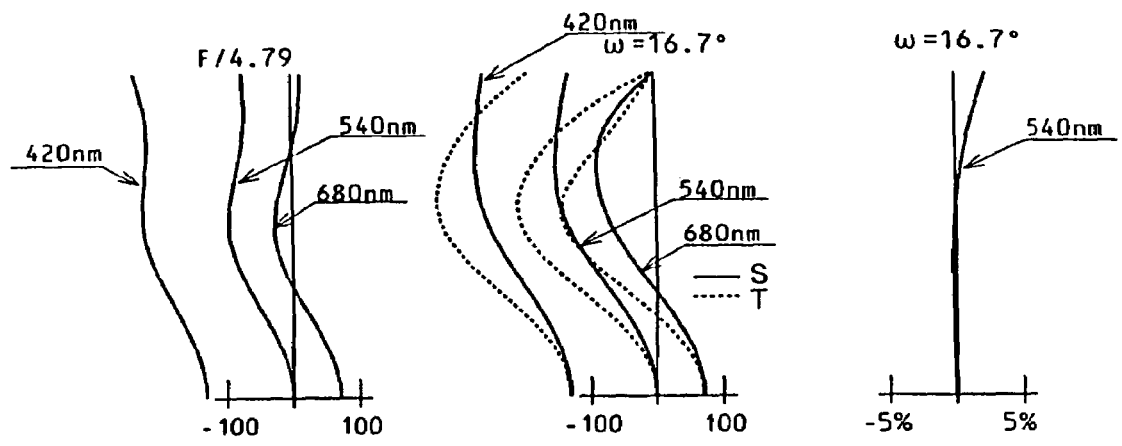
Spherical Aberration
Fig. 6A
Astigmatism
Fig. 6B
Distortion
Fig. 6C
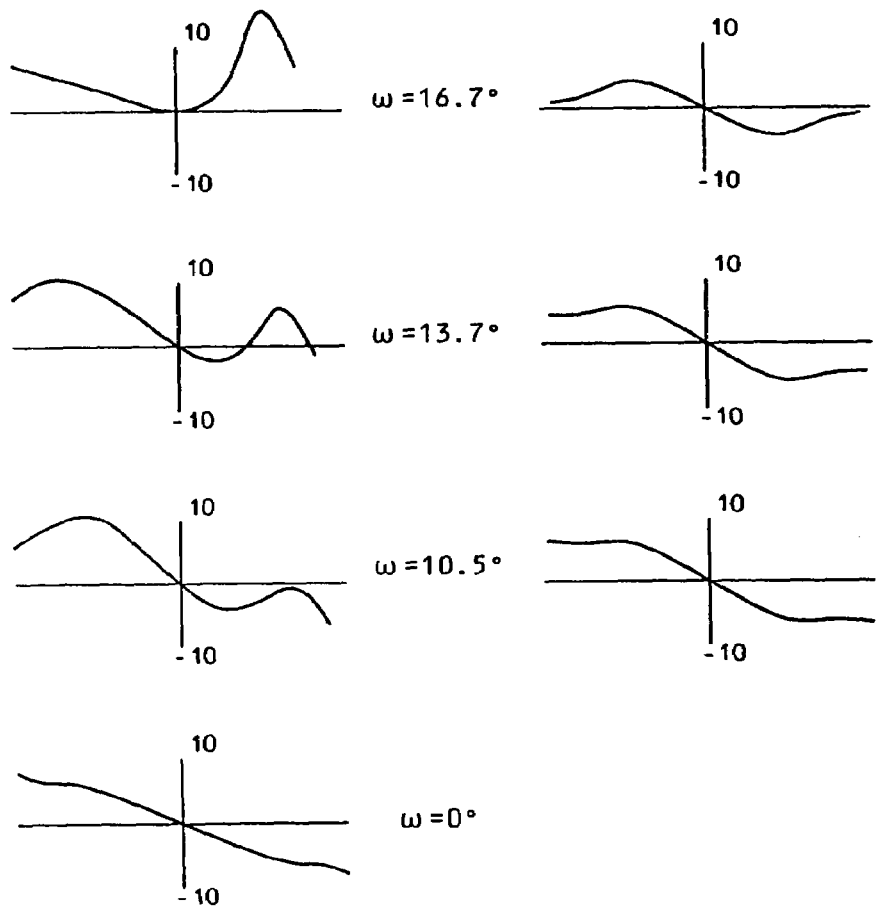
Fig. 6D

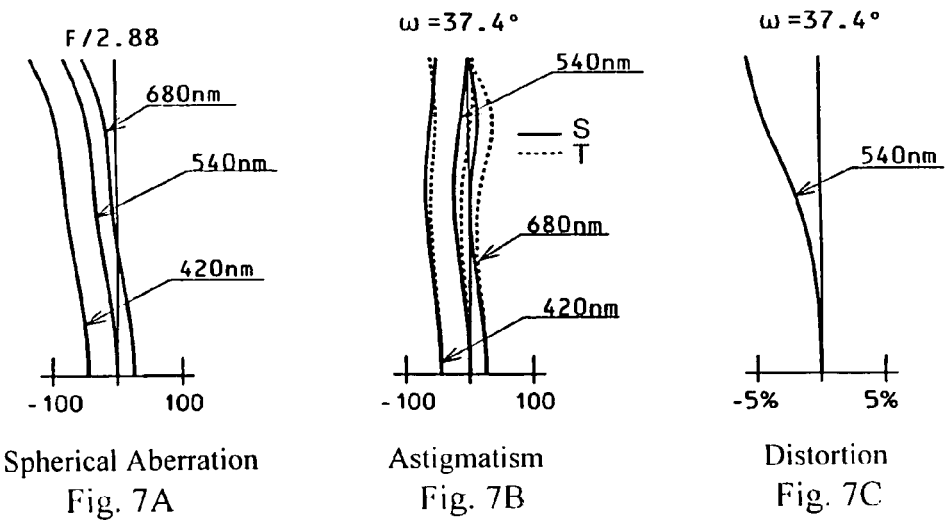
Spherical Aberration
Fig. 7A
Astigmatism
Fig. 7B
Distortion
Fig. 7C
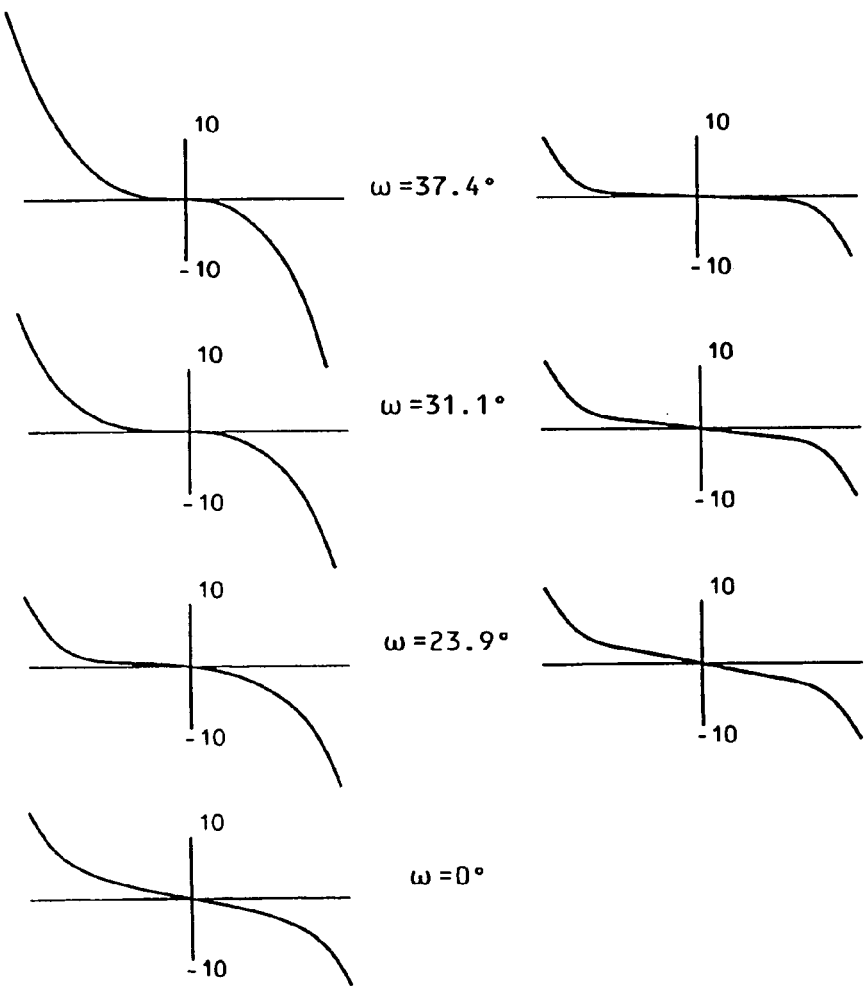
Fig. 7D

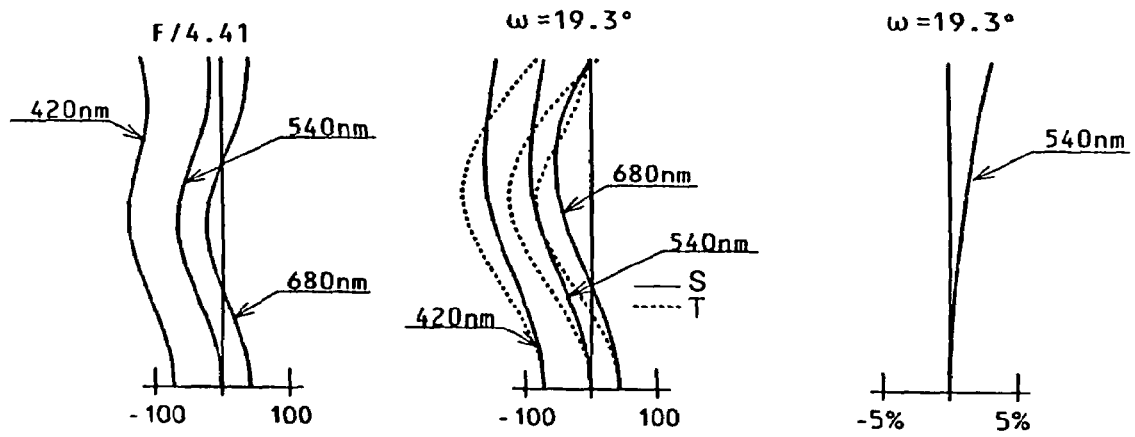
Spherical Aberration
Fig. 8A
Astigmatism
Fig. 8B
Distortion
Fig. 8C
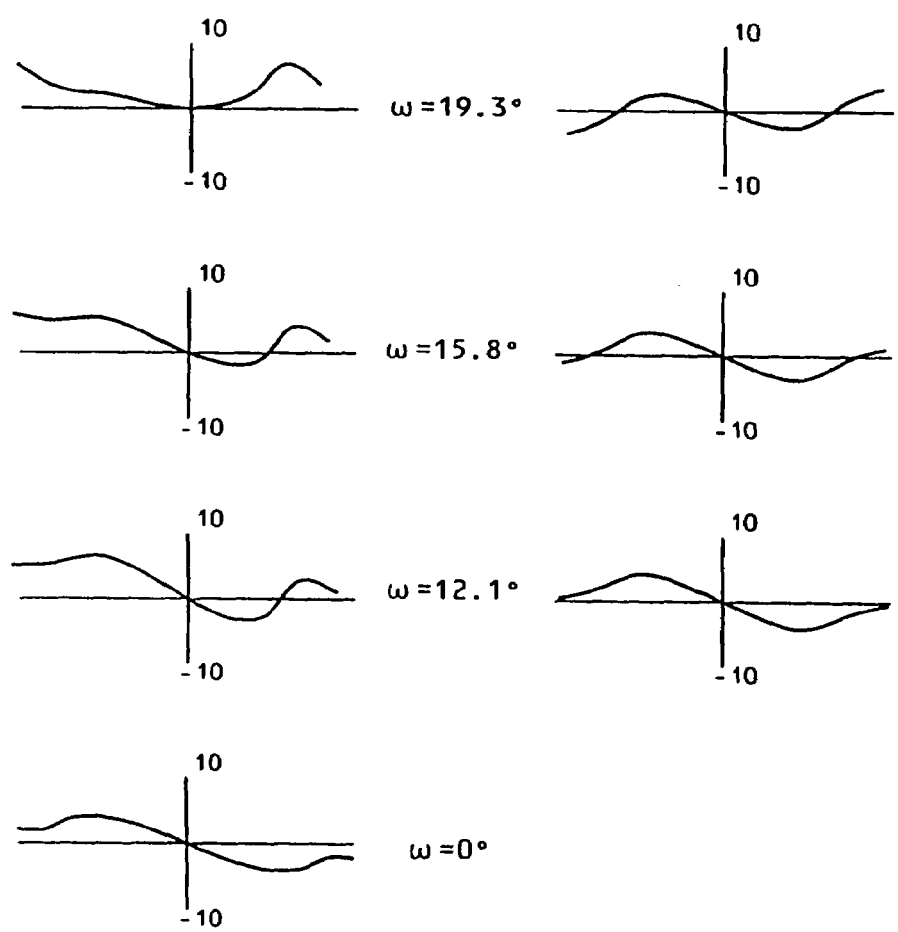
Fig. 8D Spherical Aberration Astigmatism Distortion

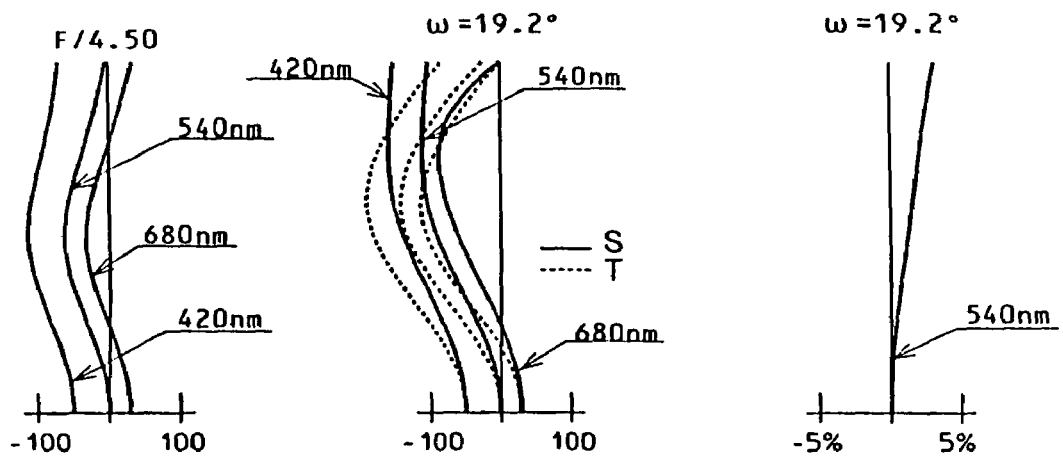
Spherical Aberration
Fig. 10A
Astigmatism
Fig. 10B
Distortion
Fig. 10C
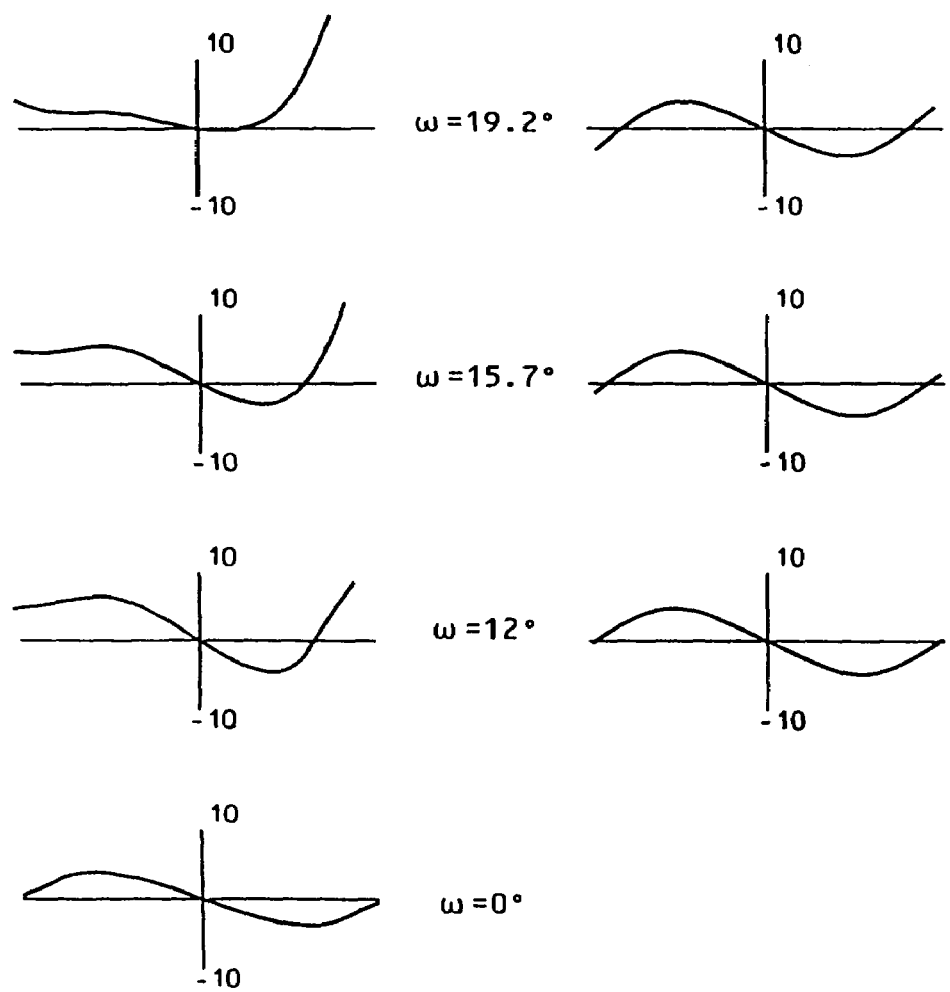
Fig. 10D

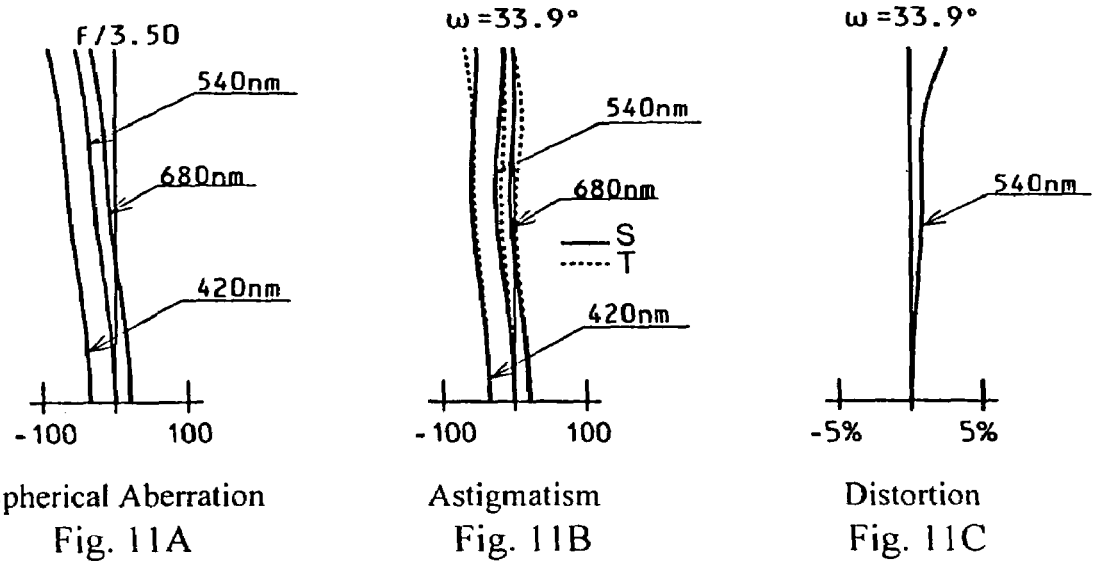
Spherical Aberration
Fig. 11A
Astigmatism
Fig. 11B
Distortion
Fig. 11C
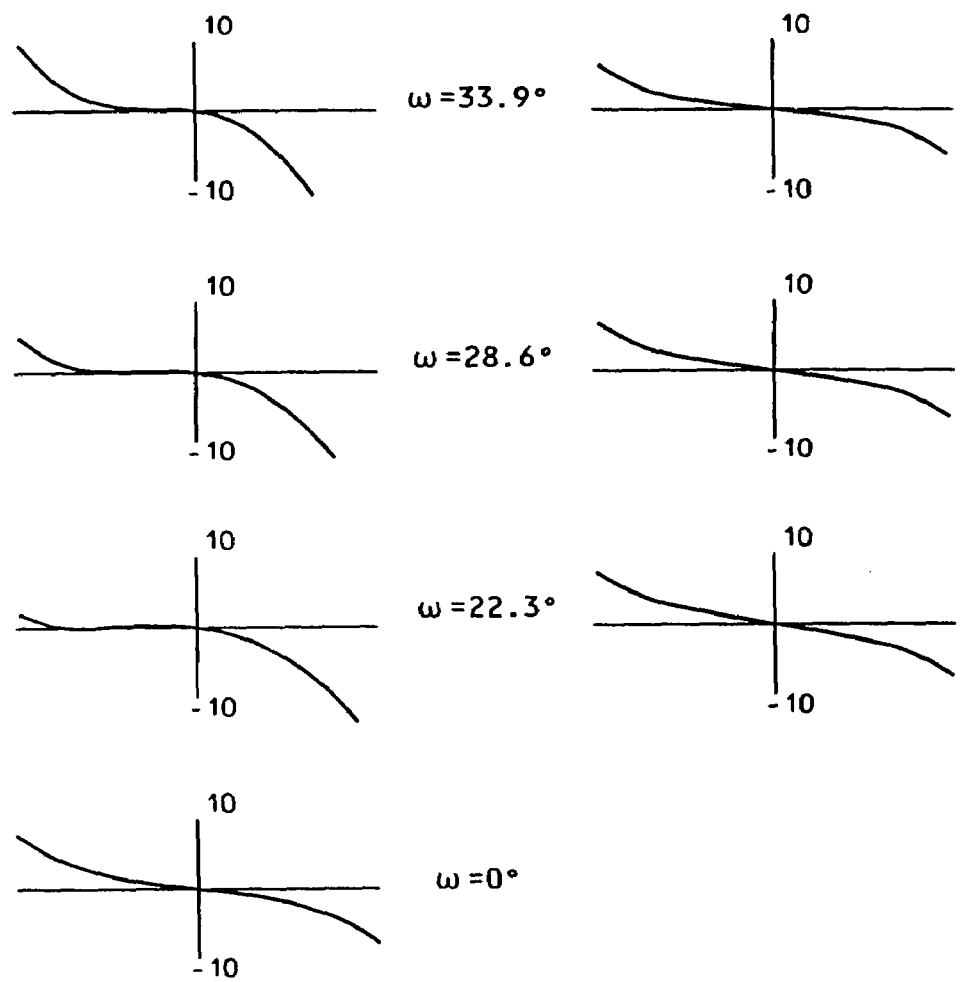
Fig. 11D

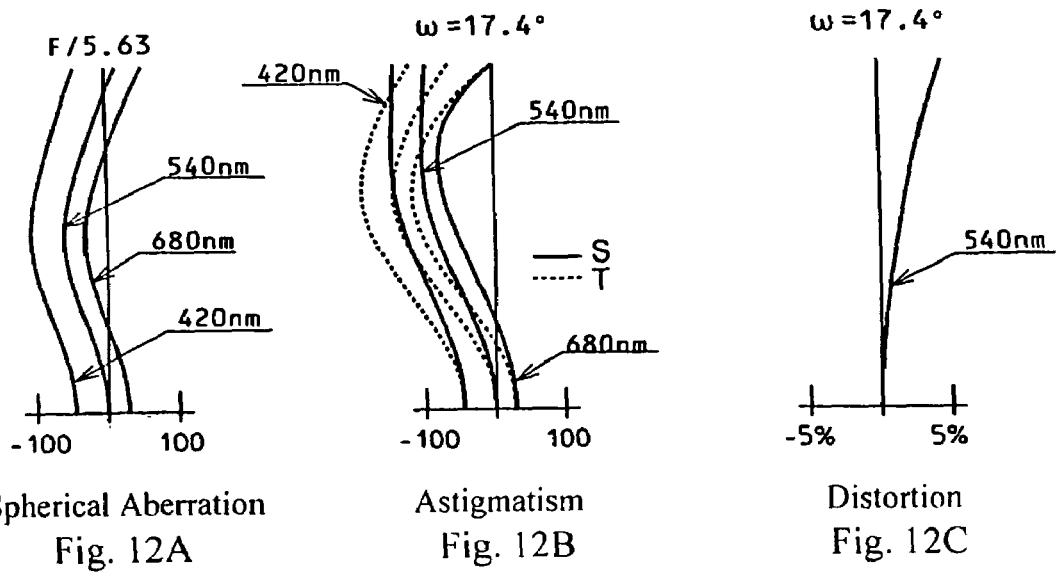
Spherical Aberration
Fig. 12A
Astigmatism
Fig. 12B
Distortion
Fig. 12C
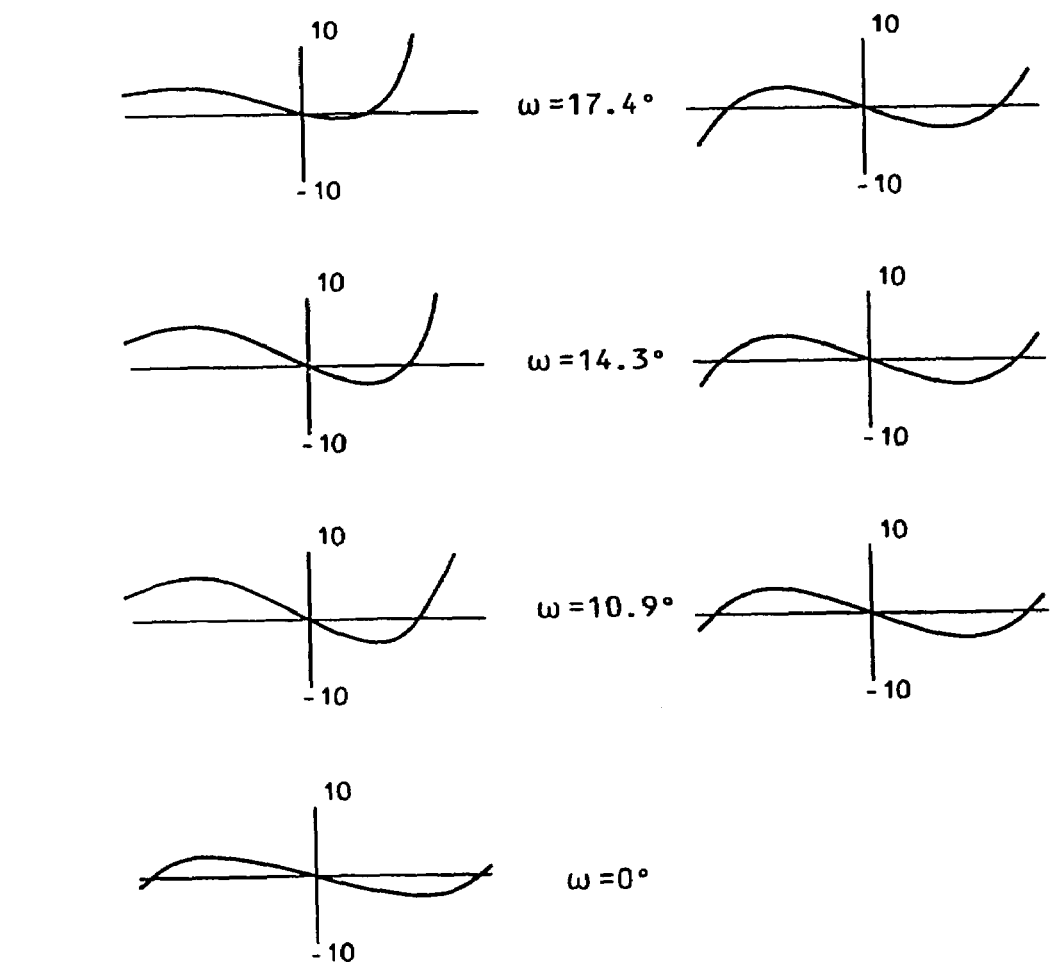
Fig. 12D

SMALL LIGHTWEIGHT ZOOM LENS

BACKGROUND OF THE INVENTION

Currently, there is a requirement that zoom lenses used for digital still cameras, surveillance TV cameras, cameras for portable terminals, video cameras, and similar imaging devices that use an imaging element, such as a CCD or a CMOS, be made smaller, lighter, and with reduced manufacturing costs. For example, Japanese Laid-Open Patent Applications H05-164965, H07-281093, and H09-184979 disclose two-group zoom lenses with two lens elements, Japanese Laid-Open Patent Applications H06-148518 and H11-23966 disclose two-group zoom lenses with three lens elements, and Japanese Laid-Open Patent Applications 2000-330019 and 2002-014285 disclose three-group zoom lenses with five lens elements that may be used to meet this requirement.

However, even though the above described zoom lenses with either a two-group, two lens element construction or a two-group, three lens element construction are able to meet the requirement of miniaturization and lighter weight, there is room for further improvement concerning the correction of various aberrations such as longitudinal chromatic aberration, curvature of field, and distortion.

Additionally, because the number of lens groups and lens elements used in such zoom lenses has become large, for example, three lens groups and five lens elements as disclosed in Japanese Laid-Open Patent Application 2002-014285, further development of a smaller and lighter weight zoom lens is desired.

Accordingly, a zoom lens with a three-group, three or four lens element construction and that is small, light in weight, and that satisfactorily corrects various aberration is required. Japanese Laid-Open Patent Application H05-323190 and Japanese Laid-Open Patent Application H06-289290 are directed to such requirements.

In a zoom lens used for a digital still camera or similar imaging device that uses a CCD or a CMOS image pickup element, the light exiting the image-side lens surface toward the image plane should be nearly parallel, that is, nearly at a zero exit angle, to the optical axis of the zoom lens. Thus, a smaller exit angle than that provided by conventional zoom lenses is desired. Additionally, a higher zoom ratio is desired, as well as a reduction in the conjugate distance to the image plane.

BRIEF SUMMARY OF THE INVENTION

The present invention relates to a small, lightweight, three-group, three component zoom lens or a three-group, four component zoom lens, where each of the lens components may be a lens element, that can satisfactorily correct various aberrations while allowing miniaturization and lighter weight with lower manufacturing costs than conventional zoom lenses. Additionally, the present invention relates to such zoom lenses for use in digital still cameras, surveillance television cameras, and similar imaging devices with image pickup elements such as a CCD or a CMOS in which the exit angle of light from the image side of the image-side lens element of the zoom lens can be smaller, that is, more nearly parallel to the optical axis of the zoom lens, and a larger zoom ratio and a shorter conjugate distance to the image plane can be provided.

BRIEF DESCRIPTION OF THE DRAWINGS

The present invention will become more fully understood from the detailed description given below and the accompanying drawings, which are given by way of illustration only and thus are not limitative of the present invention, wherein:

FIGS. 3A–3C show the spherical aberration, astigmatism, and distortion, respectively, of the zoom lens according to Embodiment 1 at the wide-angle end;

FIG. 3D shows the coma of the zoom lens according to Embodiment 1 at the wide-angle

FIGS. 6A–6C show the spherical aberration, astigmatism, and distortion, respectively, of the zoom lens according to Embodiment 2 at the telephoto end;

FIG. 6D shows the coma of the zoom lens according to Embodiment 2 at the telephoto end;

FIGS. 7A–7C show the spherical aberration, astigmatism, and distortion, respectively, of the zoom lens according to Embodiment 3 at the wide-angle end;

FIG. 7D shows the coma of the zoom lens according to Embodiment 3 at the wide-angle end;

FIGS. 8A–8C show the spherical aberration, astigmatism, and distortion, respectively, of the zoom lens according to Embodiment 3 at the telephoto end;

FIG. 8D shows the coma of the zoom lens according to Embodiment 3 at the telephoto end;

FIGS. 10A–10C show the spherical aberration, astigmatism, and distortion, respectively, of the zoom lens according to Embodiment 4 at the telephoto end;

FIG. 10D shows the coma of the zoom lens according to Embodiment 4 at the telephoto end;

FIGS. 11A–11C show the spherical aberration, astigmatism, and distortion, respectively, of the zoom lens according to Embodiment 5 at the wide-angle end;

FIG. 11D shows the coma of the zoom lens according to Embodiment 5 at the wide-angle end;

FIGS. 12A–12C show the spherical aberration, astigmatism, and distortion, respectively, of the zoom lens according to Embodiment 5 at the telephoto end; and FIG. 12D shows the coma of the zoom lens according to Embodiment 5 at the telephoto end.

DETAILED DESCRIPTION

Figure 1:
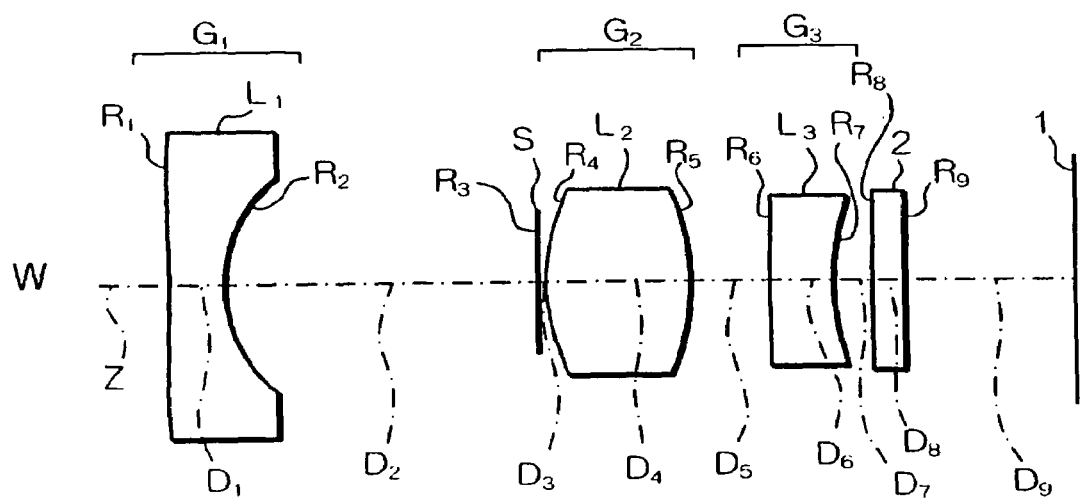
FIG. 1 shows a cross-sectional view of Embodiments 1–3 of the zoom lens of the present invention at the wide-angle end, at a middle position, and at the telephoto end.
Figure 1:
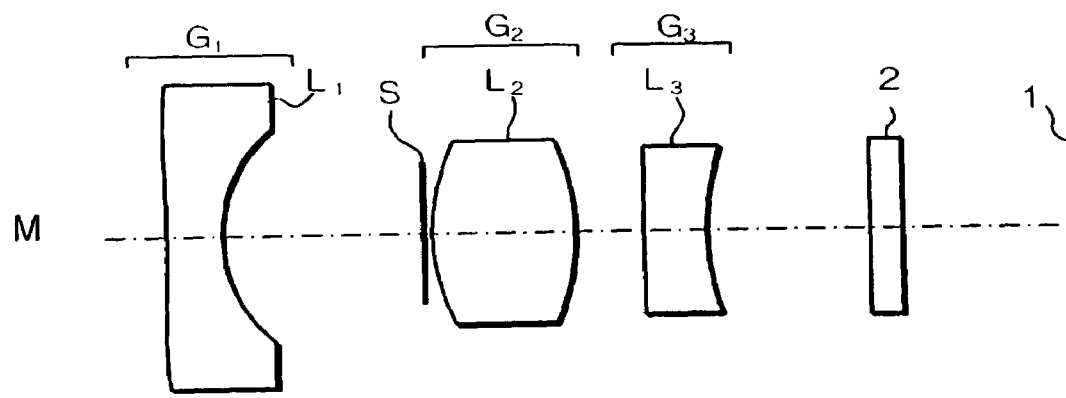
Figure 1:
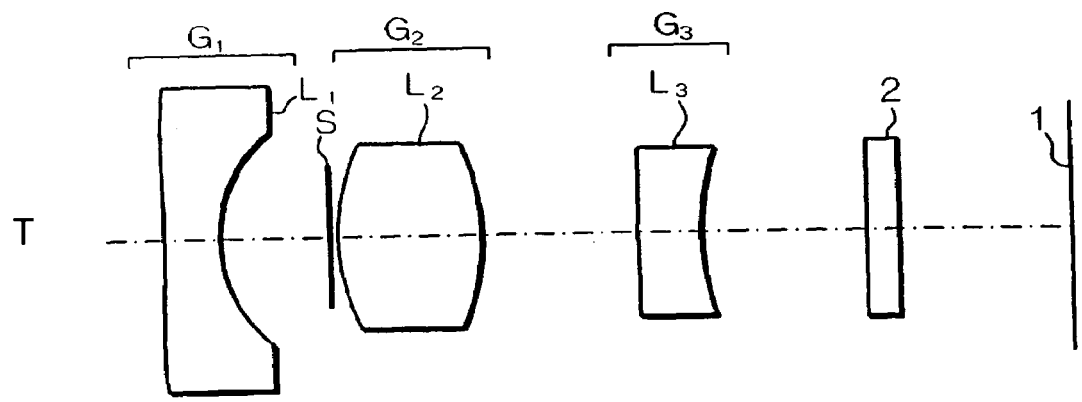

A general description of the three-group zoom lens of the present invention that pertains to the first three disclosed embodiments of the invention will first be described with reference to FIG. 1 that shows Embodiment 1. In FIG. 1, lens elements are referenced by the letter L with a subscript denoting their order from the object side of the zoom lens along the optical axis Z, from $L_1$ to $L_3$. Similarly, the radii of curvature of the optical surfaces are referenced by the letter R with a subscript denoting their order from the object side of the zoom lens, from $R_1$ to $R_9$. The on-axis surface spacings along the optical axis Z of various optical surfaces are referenced by the letter D with a subscript denoting their order from the object side of the zoom lens, from $D_1$ to $D_9$. In the same manner, the three lens groups are labeled $G_1$ to $G_3$ in order from the object side of the zoom lens and the optical components belonging to each lens group are indicated by brackets adjacent the labels $G_1$ to $G_3$.

The term "lens group" is defined in terms of "lens elements" and "lens components" as explained herein. The term "lens element" is herein defined as a single transparent mass of refractive material having two opposed refracting surfaces that are oriented at least generally transverse to the optical axis of the zoom lens. The term "lens component" is herein defined as (a) a single lens element spaced so far from any adjacent lens element that the spacing cannot be neglected in computing the optical image forming properties of the lens elements or (b) two or more lens elements that have their adjacent lens surfaces either in full overall contact or overall so close together that the spacings between adjacent lens surfaces of the different lens elements are so small that the spacings can be neglected in computing the optical image forming properties of the two or more lens elements. Thus, some lens elements may also be lens components. Therefore, the terms "lens element" and "lens component" should not be taken as mutually exclusive terms. In fact, the terms may frequently be used to describe a single lens element in accordance with part (a) above of the definition of a "lens component." The term "lens group" is herein defined as an assembly of one or more lens components in optical series and with no intervening lens components along an optical axis that during zooming is movable as a single unit relative to another lens component or other lens components.

As shown in FIG. 1, the three-group zoom lens is formed of, in order from the object side, a first lens group $G_1$ of negative refractive power formed of one or more lens components, each of which may be formed of one lens element, a second lens group $G_2$ of positive refractive power formed of one lens component, which may be one lens element, and a third lens group $G_3$ of negative refractive power formed of one lens component, which may be one lens element.

Additionally, a diaphragm stop S that acts as an aperture stop and moves as a unit with the second lens element $L_2$ is provided within the second lens group $G_2$ on the object side of the second lens element $L_2$. In this manner, a bright image is maintained as the second lens group $G_2$, made up of lens element $L_2$ and the stop S moves.

From top to bottom, FIG. 1 shows three settings of the zoom lens as the zoom lens performs zooming from a wide-angle end W, through a middle position M, to a telephoto end T by maintaining the first lens group $G_1$ stationary and moving the second lens group $G_2$ and the third lens group $G_3$ along the optical axis Z. Additionally, a plane-parallel plate 2, which is a cover glass or the like, is provided between the third lens group $G_3$ and the image plane 1 where, for example, a planar portion of a CCD image pickup element is positioned.

With this construction, it is unnecessary to take into consideration the change of effective aperture of the first lens element $L_1$ as is done when the first lens group $G_1$ is one of the lens groups that moves during zooming. Additionally, because it is unnecessary to mount a lens drive mechanism on the inner part of the holding frame of the first lens group $G_1$, a large ratio of the effective aperture relative to the lens external diameter of the first lens group $G_1$ can be obtained. This makes possible a zoom lens that has an excellent resolution performance and the minimum shading of the rim rays.

The first lens element $L_1$ that forms the first lens group $G_1$ is formed so that the positive refractive power of its object-side lens surface becomes stronger toward the periphery and so that the negative refractive power of its image-side lens surface becomes stronger toward the periphery. Generally, when the first lens group $G_1$ has negative refractive power, it tends to generate negative distortion. However, by forming the first lens element $L_1$ as described above, negative distortion may be controlled.

Preferably, the second lens element $L_2$ of the second lens group $G_2$ and the third lens element $L_3$ of the third lens group $G_3$ are made of plastic and both lens surfaces of each of these lens elements are aspheric.

The lens surfaces that are aspheric are defined using the following equation:

$$Z=[(C \cdot Y^2)/\{1+(1-K \cdot C^2 \cdot Y^2)^{1/2}\}]+\Sigma(A_i Y^i) \qquad \text{Equation (A)}$$

where

Z is the length (in mm) of a line drawn from a point on the aspheric lens surface at a distance Y from the optical axis to the tangential plane of the aspheric surface vertex, C is the curvature (=1/the radius of curvature, R) of the aspheric lens surface on the optical axis, Y is the distance (in mm) from the optical axis, K is the eccentricity, and $A_i$ is the ith aspheric coefficient, and the summation extends over i.

The three-group zoom lens of the present invention satisfies the following Conditions (1)–(3):

| | |
|---|---|
| $1.9 < ft/fw < 2.6$ | Condition (1) |
| $4.0 < TCL/fw < 5.3$ | Condition (2) |
| $0.7 < Bfw/fw < 1.3$ | Condition (3) | where ft is the focal length of the zoom lens at the telephoto end, fw is the focal length of the zoom lens at the wide-angle end, MTL is the longest distance from the most object-side lens surface to the image plane, when focused on an object at infinity, for any zoom position from the wide-angle end through the telephoto end; and Bfw is the back focal length of the zoom lens at the wide-angle end.

By satisfying all of Conditions (1)–(3), relative to current zoom lenses, the zoom ratio can be increased, the conjugate distance to the image plane can be shortened, and it is possible to construct a camera with satisfactory efficiency by enabling light rays to strike the image pickup plane of a camera image pickup element, such as a CCD, CMOS or the like, which is at the image plane, at a smaller angle of incidence.

Additionally, the three-group zoom lens of the present invention preferably satisfies the following Conditions (4) and (5):

$$0.25 < |f2/f3| < 0.70 \quad \text{Condition (4)}$$

$$0.20 < |f1/f3| < 1.60 \quad \text{Condition (5)}$$

where f2 is the focal length of the second lens group $G_2$,
f3 is the focal length of the third lens group $G_3$, and
f1 is the focal length of the first lens group $G_1$.

Condition (4) maintains the refractive power at an appropriate value as the magnification changes during zooming. When the upper limit of Condition (4) is not satisfied, the amount of movement of the second lens group $G_2$ becomes large during zooming and large fluctuations in astigmatism occur during zooming because of the refractive power of the second lens element $L_2$ being relatively small. On the other hand, when the lower limit of Condition (4) is not satisfied, the refractive power of the third lens element $L_3$ is relatively small and the amount of movement of the third lens group $G_3$ becomes large during zooming. This results in variations in the exit angle of light rays from the image-side surface of the third lens group $G_3$ during zooming becoming large.

Condition (5) maintains a proper balance of axial aberrations, curvature of field, and distortion during focusing. When Condition (5) is not satisfied, it is difficult to maintain a proper balance of these aberrations.

Further, when the third lens group $G_3$ is the focusing lens group, preferably the three-group zoom lens of the present invention satisfies the following Condition (6):

$$1.70 < |f3/fw| < 4.20 \quad \text{Condition (6)}$$

where f3 and fw are as defined above.

By satisfying Condition (6), a desired distance between the third lens group $G_3$ that is moved during focusing and zooming and the first lens group $G_1$ can be maintained, the exit pupil position and the curvature of field (both of which are highly affected by the refractive power of the third lens group $G_3$) can be properly adjusted, and the overall length of the three-group zoom lens can be prevented from becoming too long.

Additionally, in the three-group zoom lens of the present invention, preferably the second lens element $L_2$ and/or the third lens element $L_3$, which may move during zooming, are plastic lenses. More preferably, all the lens elements of the three-group zoom lens are made of plastic. By making the second lens element $L_2$ and/or the third lens element $L_3$ of plastic, they become lighter. This enables the drive motor to be made smaller because the load on the drive mechanism is reduced. Furthermore, by making all lens elements of plastic, the weight and corresponding load requirements can be further reduced, leading to further reductions in size. Also, using plastic as the material of the lens elements enables aspheric surfaces to be formed easily, thereby reducing manufacturing cost and allowing better correction of aberrations with fewer lens elements.

Embodiments 1–3 of the present invention will now be individually described with further reference to the drawings.

Embodiment 1

In Embodiment 1, as shown in FIG. 1, the first lens group $G_1$ is formed of a single first lens element $L_1$ of negative refractive power. In Embodiment 1, all the lens elements are made of plastic and have aspheric surfaces.

Table 1 below lists numerical values of lens data for Embodiment 1 based on the focal length of the three-group Zoom lens being normalized to 100 mm at the wide-angle end. More specifically, Table 1 lists the surface number # in order from the object side, the radius of curvature R (in mm) of each surface near the optical axis, the on-axis surface spacing D (in mm) between surfaces, as well as the refractive index $N_e$ (at the e-line of λ=546.1 nm) and the Abbe number $v_d$ (at the d-line of 587.6 nm) of each lens element for Embodiment 1. Listed in the bottom portion of Table 1 are the zoom ratio ZR (i.e., the focal length at the telephoto end divided by the focal length at the wide-angle end), the maximum image angle 2ω at the wide-angle end, and the maximum total length MTL (defined as the longest distance from the most object-side lens surface to the image plane, when focused on an object at infinity, for any zoom position from the wide-angle end through the telephoto end) for Embodiment 1.

TABLE 1

| # | R | D | $N_e$ | $v_d$ |
|---|---|---|---|---|
| 1* | −488.00 | 28.87 | 1.51 | 56.0 |
| 2* | 80.03 | $D_2$ (variable) | | |
| 3 | ∞ (stop) | 4.28 | | |
| 4* | 102.14 | 76.57 | 1.51 | 56.0 |
| 5* | −120.34 | $D_5$ (variable) | | |
| 6* | 542.52 | 33.42 | 1.51 | 56.0 |
| 7* | 142.79 | $D_7$ (variable) | | |
| 8 | ∞ | 16.71 | 1.52 | 64.1 |
| 9 | ∞ | | | |
| | ZR = 2.3 | 2ω = 68.2° | MTL = 485 mm | |

The surfaces with a * to the right of the surface number in Table 1 are aspheric lens surfaces, with the aspheric surface shape expressed by Equation (A) above.

Table 2 below lists the values of the constants K and $A_3$–$A_{10}$ used in Equation (A) above for each of the aspheric surfaces indicated in Table 1. Aspheric coefficients that are not present in Table 2 are zero. An "E" in the data indicates that the number following the "E" is the exponent to the base 10. For example, "1.0E-02" represents the number $1.0 \times 10^{-2}$.

TABLE 2

| # | K | $A_3$ | $A_4$ | $A_5$ | $A_6$ | $A_7$ | $A_8$ | $A_9$ | $A_{10}$ |
|---|---|---|---|---|---|---|---|---|---|
| 1 | 1.00000 | 0.10532E−4 | 0.15232E−7 | 0.24153E−9 | −0.17318E−11 | 0.14191E−15 | 0.56955E−17 | −0.17857E−21 | 0.15127E−22 |
| 2 | 1.00000 | −0.84669E−5 | 0.32030E−6 | 0.61668E−10 | −0.44429E−12 | −0.84167E−17 | 0.10511E−17 | 0.35938E−23 | 0.14467E−22 |
| 4 | 1.00000 | 0.00000 | −0.23631E−6 | 0.00000 | −0.36096E−13 | 0.00000 | 0.26662E−17 | 0.00000 | 0.41674E−22 |
| 5 | 1.00000 | 0.00000 | 0.39787E−7 | 0.00000 | −0.25677E−14 | 0.00000 | 0.00000 | 0.00000 | 0.30056E−26 |

TABLE 2-continued

| # | K | $A_3$ | $A_4$ | $A_5$ | $A_6$ | $A_7$ | $A_8$ | $A_9$ | $A_{10}$ |
|---|---|---|---|---|---|---|---|---|---|
| 6 | 1.00000 | 0.58155E−5 | −0.52628E−6 | −0.12335E−9 | −0.15528E−12 | 0.10134E−16 | 0.64013E−17 | −0.64182E−22 | 0.29578E−21 |
| 7 | 1.00000 | 0.81690E−5 | −0.15541E−6 | −0.20459E−9 | 0.84575E−13 | −0.68786E−16 | −0.82460E−18 | −0.70621E−22 | 0.34458E−21 |

In the zoom lens of Embodiment 1, both the second lens group $G_2$ and the third lens group $G_3$ move during zooming. Therefore, the on-axis spacing $D_2$ between lens groups $G_1$ and $G_2$, the on-axis spacing $D_5$ between lens groups $G_2$ and $G_3$, and the on-axis spacing $D_7$ between the lens group $G_3$ and the plane-parallel plate 2 change with zooming.

Table 3 below lists the values of the focal length f, the f-number $F_{NO}$, and the variable on-axis surface spacings $D_2$, $D_5$, and $D_7$ at the wide-angle end (f=100 mm) and at the telephoto end (f=230.33 mm).

TABLE 3

| f | $F_{NO}$ | $D_2$ | $D_5$ | $D_7$ |
|---|---|---|---|---|
| 100 | 2.8 | 166.67 | 42.77 | 21.27 |
| 230.33 | 4.3 | 57.82 | 84.31 | 88.58 |

The zoom lens of Embodiment 1 of the present invention satisfies Conditions (1)–(6) above as set forth in Table 4 below.

TABLE 4

| Condition No. | Condition | Values |
|---|---|---|
| (1) | 1.9 < ft/fw < 2.6 | 2.303 |
| (2) | 4.0 < MTL/fw < 5.3 | 4.850 |
| (3) | 0.7 < Bfw/fw < 1.3 | 1.236 |
| (4) | 0.25 < |f2/f3| < 0.70 | 0.314 |
| (5) | 0.20 < |f1/f3| < 1.60 | 0.339 |
| (6) | 1.70 < |f3/fw| < 4.20 | 3.904 |

FIGS. 3A–3C show the spherical aberration (in mm), the astigmatism (in mm), and the distortion, respectively, of the zoom lens of Embodiment 1 at the wide-angle end. FIG. 3D shows the coma of the zoom lens of Embodiment 1 at the wide-angle end for various half-field angles ω for both the tangential (left column) and sagittal (right column) image surfaces at a wavelength of 540 nm.

Figure 4A:
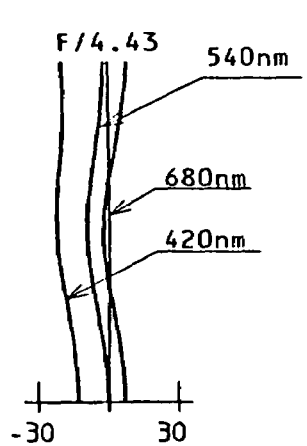
FIGS. 4A–4C show the spherical aberration, astigmatism, and distortion, respectively, of the zoom lens according to Embodiment 1 at the telephoto end.
Figure 4B:
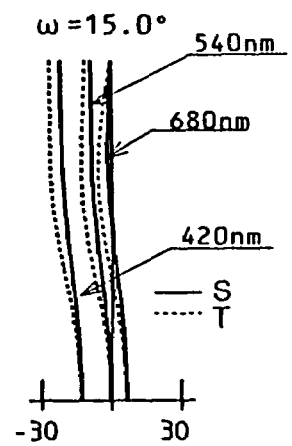
Figure 4C:
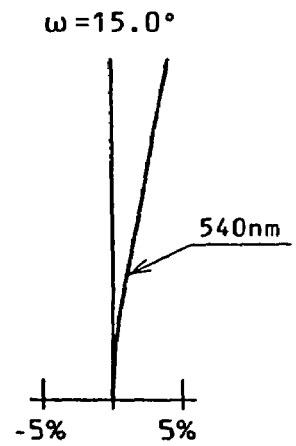
Figure 4D:
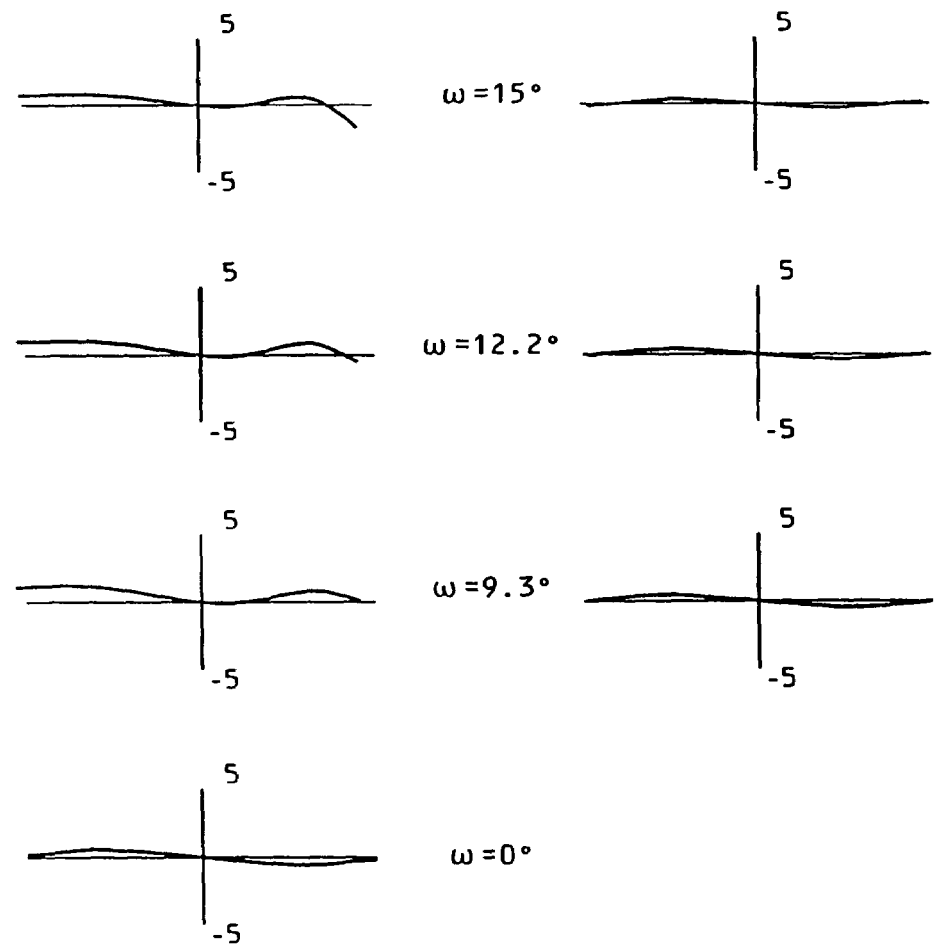
FIG. 4D shows the coma of the zoom lens according to Embodiment 1 at the telephoto end.

FIGS. 4A–4C show the spherical aberration (in mm), astigmatism (in mm), and the distortion, respectively, of the zoom lens of Embodiment 1 at the telephoto end. FIG. 4D shows the coma of the zoom lens of Embodiment 1 at the telephoto end for various half-field angles ω for both the tangential (left column) and sagittal (right column) image surfaces at a wavelength of 540 nm. In FIGS. 3A and 4A, the spherical aberration is shown for the wavelengths 420 nm, 540 nm, and 680 nm. In FIGS. 3B, 3C, 4B, and 4C, ω is the half-field angle. In FIGS. 3B and 4B, the astigmatism is shown for the sagittal image surface S and the tangential image surface T. In FIGS. 3C and 4C, the distortion is measured at 540 nm. As is apparent from these figures, the various aberrations are favorably corrected over the entire range of zoom.

Embodiment 2

Embodiment 2 is very similar to Embodiment 1 and therefore only the differences between Embodiment 2 and Embodiment 1 will be explained. Embodiment 2 differs from Embodiment 1 in its lens element configuration by having different radii of curvature of the lens surfaces, different aspheric coefficients of the aspheric lens surfaces, and different optical element surface spacings.

Table 5 below lists numerical values of lens data for Embodiment 2 based on the focal length of the three-group zoom lens being normalized to 100 mm at the wide-angle end. Table 5 lists the surface number #, in order from the object side, the radius of curvature R (in mm) of each surface near the optical axis, the on-axis surface spacing D (in mm) between surfaces, as well as the refractive index $N_e$ (at the e-line of λ=546.1 nm) and the Abbe number $v_d$ (at the d-line of 587.6 nm) of each lens element for Embodiment 2. Listed in the bottom portion of Table 5 are the zoom ratio ZR (i.e., the focal length at the telephoto end divided by the focal length at the wide-angle end), the maximum image angle 2ω at the wide-angle end, and the maximum total length MTL (defined as the longest distance from the most object-side lens surface to the image plane, when focused on an object at infinity, for any zoom position from the wide-angle end through the telephoto end) for Embodiment 2.

TABLE 5

| # | R | D | $N_e$ | $v_d$ |
|---|---|---|---|---|
| 1* | −688.53 | 26.29 | 1.51 | 56.0 |
| 2* | 80.63 | $D_2$ (variable) | | |
| 3 | ∞ (stop) | −0.96 | | |
| 4* | 102.27 | 81.12 | 1.51 | 56.0 |
| 5* | −112.27 | $D_5$ (variable) | | |
| 6* | 166.50 | 33.03 | 1.51 | 56.0 |
| 7* | 70.49 | $D_7$ (variable) | | |
| 8 | ∞ | 12.83 | 1.51 | 56.0 |
| 9 | ∞ | | | |
| | ZR = 2.5 | 2ω = 79.4° | MTL = 471.312 mm | |

The surfaces with a * to the right of the surface number in Table 15 are aspheric lens surfaces, with the aspheric surface shape expressed by Equation (A) above.

Table 6 below lists the values of the constants K and $A_3$–$A_6$ and $A_8$ used in Equation (A) above for each of the aspheric surfaces indicated in Table 5. Aspheric coefficients that are not present in Table 6 are zero. An "E" in the data indicates that the number following the "E" is the exponent to the base 10. For example, "1.0E-02" represents the number $1.0 \times 10^{-2}$.

TABLE 6

| # | K | $A_3$ | $A_4$ | $A_5$ | $A_6$ | $A_8$ |
|---|---|---|---|---|---|---|
| 1 | 1.00000 | 0.11404E-4 | -0.13366E-7 | 0.15165E-9 | -0.13646E-11 | 0.00000 |
| 2 | 1.00000 | -0.33916E-6 | 0.28369E-6 | 0.00000 | -0.34694E-12 | 0.00000 |
| 4 | 1.00000 | 0.00000 | -0.23561E-6 | 0.00000 | -0.50190E-13 | 0.18067E-17 |
| 5 | 1.00000 | 0.00000 | 0.36531E-7 | 0.00000 | 0.21973E-13 | 0.00000 |
| 6 | 1.00000 | -0.63592E-5 | -0.50629E-6 | -0.12806E-9 | 0.00000 | 0.00000 |
| 7 | 1.00000 | -0.27270E-4 | -0.11239E-6 | -0.15389E-9 | 0.00000 | 0.00000 |

In the zoom lens of Embodiment 2, both the second lens group $G_2$ and the third lens group $G_3$ move during zooming. Therefore, the on-axis spacing $D_2$ between lens groups $G_1$ and $G_2$, the on-axis spacing $D_5$ between lens groups $G_2$ and $G_3$, and the on-axis spacing $D_7$ between the lens group $G_3$ and the plane-parallel plate 2 change with zooming. Table 7 below lists the values of the focal length f, the f-number $F_{NO}$, and the variable on-axis surface spacings $D_2$, $D_5$, and $D_7$ at the wide-angle end (f=100 mm) and at the telephoto end (f=250 mm).

TABLE 7

| f | $F_{NO}$ | $D_2$ | $D_5$ | $D_7$ |
|---|---|---|---|---|
| 100 | 2.8 | 174.10 | 41.68 | 22.44 |
| 250 | 4.4 | 61.24 | 68.01 | 108.98 |

The zoom lens of Embodiment 2 of the present invention satisfies Conditions (1)–(6) above as set forth in Table 8 below.

TABLE 8

| Condition No. | Condition | Value |
|---|---|---|
| (1) | 1.9 < ft/fw < 2.6 | 2.500 |
| (2) | 4.0 < MTL/fw < 5.3 | 4.713 |
| (3) | 0.7 < Bfw/fw < 1.3 | 1.086 |
| (4) | 0.25 < |f2/f3| < 0.70 | 0.444 |
| (5) | 0.20 < |f1/f3| < 1.60 | 0.516 |
| (6) | 1.70 < |f3/fw| < 4.20 | 2.735 |

Figure 5A:
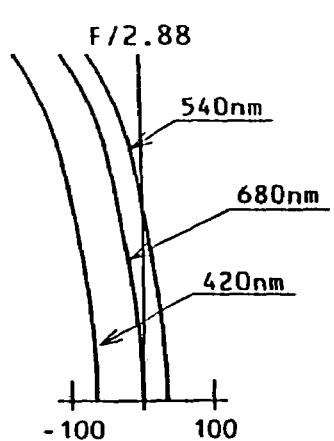
FIGS. 5A–5C show the spherical aberration, astigmatism, and distortion, respectively, of the zoom lens according to Embodiment 2 at the wide-angle end.
Figure 5B:
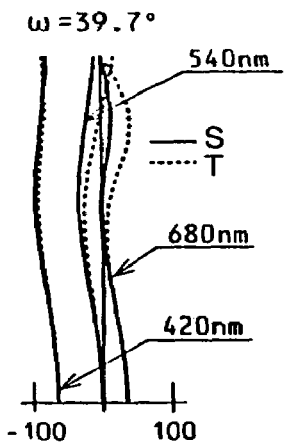
Figure 5C:
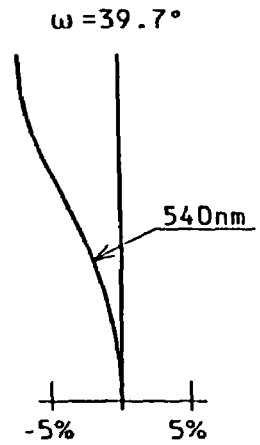
Figure 5D:
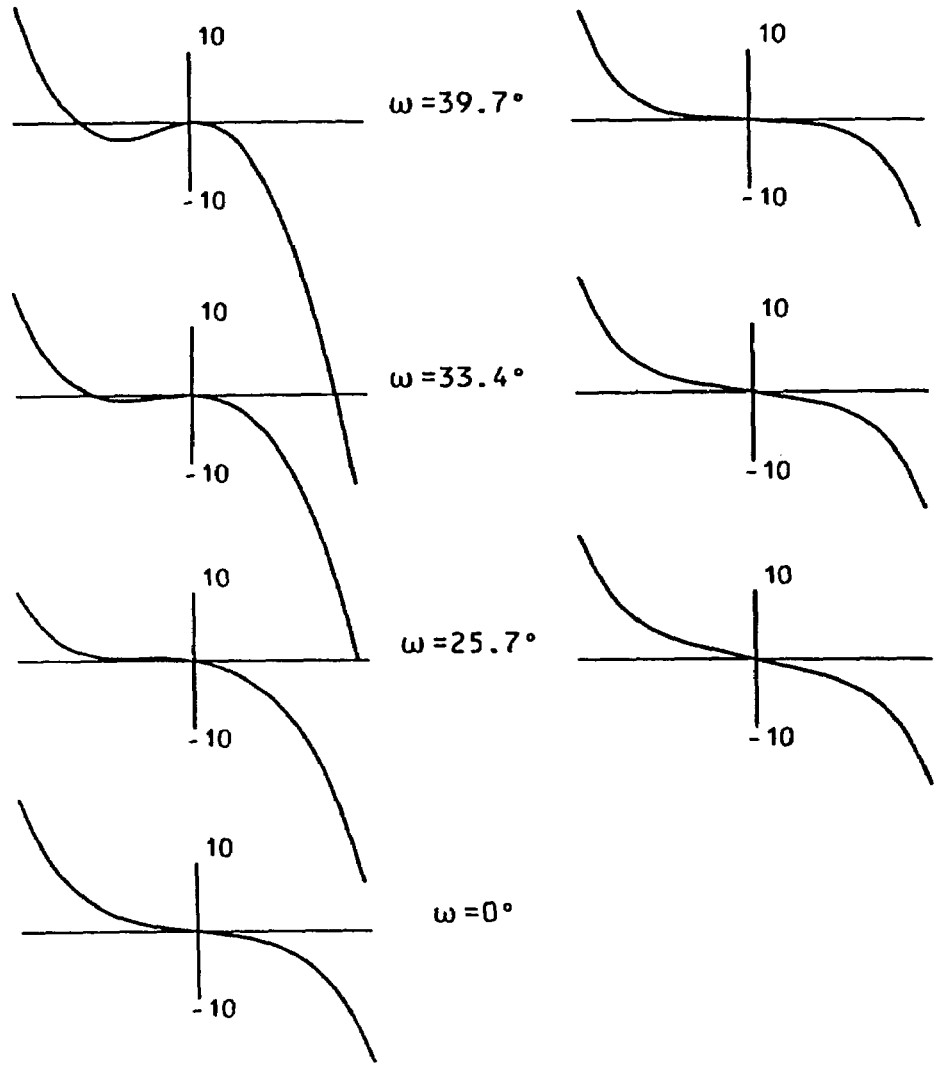
FIG. 5D shows the coma of the zoom lens according to Embodiment 2 at the wide-angle end.

FIGS. 5A–5C show the spherical aberration (in mm), the astigmatism (in mm), and the distortion, respectively, of the zoom lens of Embodiment 2 at the wide-angle end. FIG. 5D shows the coma of the zoom lens of Embodiment 2 at the wide-angle end for various half-field angles ω for both the tangential (left column) and sagittal (right column) image surfaces at a wavelength of 540 nm.

FIGS. 6A–6C show the spherical aberration (in mm), the astigmatism (in mm), and the distortion, respectively, of the zoom lens of Embodiment 2 at the telephoto end. FIG. 6D shows the coma of the zoom lens of Embodiment 2 at the telephoto end for various half-field angles ω for both the tangential (left column) and sagittal (right column) image surfaces at a wavelength of 540 nm. In FIGS. 5A and 6A, the spherical aberration is shown for the wavelengths 420 nm, 540 nm, and 680 nm. In FIGS. 5B, 5C, 6B, and 6C, ω is the half-field angle. In FIGS. 5B and 6B, the astigmatism is shown for the sagittal image surface S and the tangential image surface T. In FIGS. 5C and 6C, the distortion is measured at 540 nm. As is apparent from these figures, the various aberrations are favorably corrected over the entire range of zoom.

Embodiment 3

Embodiment 3 is very similar to Embodiment 1 and therefore only the differences between Embodiment 3 and Embodiment 1 will be explained. Embodiment 3 differs from Embodiment 1 in its lens element configuration by having different radii of curvature of the lens surfaces, different aspheric coefficients of the aspheric lens surfaces, and different optical element surface spacings.

Table 9 below lists numerical values of lens data for Embodiment 3 based on the focal length of the three-group zoom lens being normalized to 100 mm at the wide-angle end. Table 9 lists the surface number #, in order from the object side, the radius of curvature R (in mm) of each surface near the optical axis, the on-axis surface spacing D (in mm) between surfaces, as well as the refractive index $N_e$ (at the e-line of λ=546.1 nm) and the Abbe number $v_d$ (at the d-line of 587.6 nm) of each lens element for Embodiment 3. Listed in the bottom portion of Table 9 are the zoom ratio ZR (i.e., the focal length at the telephoto end divided by the focal length at the wide-angle end), the maximum image angle 2ω at the wide-angle end, and the maximum total length MTL (defined as the longest distance from the most object-side lens surface to the image plane, when focused on an object at infinity, for any zoom position from the wide-angle end through the telephoto end) for Embodiment 3.

TABLE 9

| # | R | D | $N_e$ | $v_d$ |
|---|---|---|---|---|
| 1* | -322.90 | 24.34 | 1.51 | 56.3 |
| 2* | 86.10 | $D_2$ (variable) | | |
| 3 | ∞ (stop) | -1.77 | | |
| 4* | 88.36 | 72.80 | 1.51 | 56.3 |
| 5* | -104.46 | $D_5$ (variable) | | |
| 6* | 136.54 | 29.37 | 1.59 | 30.3 |
| 7* | 60.75 | $D_7$ (variable) | | |
| 8 | ∞ | 11.47 | 1.52 | 64.1 |
| 9 | ∞ | | | |
| | ZR = 2.0 | 2ω = 74.8° | MTL = 409.873 mm | |

The surfaces with a * to the right of the surface number in Table 9 are aspheric lens surfaces, with the aspheric surface shape expressed by Equation (A) above.

Table 10 below lists the values of the constants K and $A_3$–$A_{10}$ used in Equation (A) above for each of the aspheric surfaces indicated in Table 9. Aspheric coefficients that are not present in Table 10 are zero. An "E" in the data indicates that the number following the "E" is the exponent to the base 10. For example, "1.0E-02" represents the number $1.0 \times 10^{-2}$.

TABLE 10

| # | K | $A_3$ | $A_4$ | $A_5$ | $A_6$ | $A_7$ | $A_8$ | $A_9$ | $A_{10}$ |
|---|---|---|---|---|---|---|---|---|---|
| 1 | 1.00000 | 0.23661E−4 | −0.43472E−7 | −0.12531E−9 | −0.15769E−11 | 0.11345E−14 | 0.33324E−17 | 0.31098E−20 | 0.11180E−22 |
| 2 | 1.00000 | 0.97088E−5 | 0.43508E−6 | 0.87808E−9 | −0.45549E−12 | 0.83975E−15 | 0.20718E−17 | 0.62525E−21 | 0.27697E−23 |
| 4 | 1.00000 | 0.18790E−5 | −0.36290E−6 | 0.28666E−11 | −0.57318E−12 | 0.35729E−20 | 0.64905E−17 | 0.25521E−25 | 0.29257E−25 |
| 5 | 1.00000 | −0.89796E−6 | 0.69319E−7 | −0.86018E−12 | 0.10458E−11 | −0.40601E−19 | 0.23240E−18 | −0.28226E−26 | 0.67153E−24 |
| 6 | 1.00000 | 0.38592E−5 | −0.13374E−5 | 0.18644E−10 | 0.36964E−12 | −0.11366E−14 | 0.50165E−18 | 0.23660E−21 | −0.25245E−25 |
| 7 | 1.00000 | −0.73812E−5 | −0.12386E−5 | −0.84918E−9 | 0.12200E−12 | 0.19257E−15 | 0.84514E−18 | −0.91241E−22 | 0.48349E−25 |

In the zoom lens of Embodiment 3, both the second lens group $G_2$ and the third lens group $G_3$ move during zooming. Therefore, the on-axis spacing $D_2$ between lens groups $G_1$ and $G_2$, the on-axis spacing $D_5$ between lens groups $G_2$ and $G_3$, and the on-axis spacing $D_7$ between the lens group $G_3$ and the plane-parallel plate 2 change with zooming. Table 11 below lists the values of the focal length f, the f-number $F_{NO}$, and the variable on-axis surface spacings $D_2$, $D_5$, and $D_7$ at the wide-angle end (f=100 mm) and at the telephoto end (f=196.5 mm).

TABLE 11

| f | $F_{NO}$ | $D_2$ | $D_5$ | $D_7$ |
|---|---|---|---|---|
| 100 | 2.8 | 141.39 | 36.82 | 20.07 |
| 196.5 | 4.4 | 66.38 | 48.05 | 83.85 |

The zoom lens of Embodiment 3 of the present invention satisfies Conditions (1)–(6) above as set forth in Table 12 below.

TABLE 12

| Condition No. | Condition | Value |
|---|---|---|
| (1) | 1.9 < ft/fw < 2.6 | 1.965 |
| (2) | 4.0 < MTL/fw < 5.3 | 4.099 |
| (3) | 0.7 < Bfw/fw < 1.3 | 1.007 |
| (4) | 0.25 < |f2/f3| < 0.70 | 0.495 |
| (5) | 0.20 < |f1/f3| < 1.60 | 0.601 |
| (6) | 1.70 < |f3/fw| < 4.20 | 2.172 |

FIGS. 7A–7C show the spherical aberration (in mm), the astigmatism (in mm), and the distortion, respectively, of the zoom lens of Embodiment 3 at the wide-angle end. FIG. 7D shows the coma of the zoom lens of Embodiment 3 at the wide-angle end for various half-field angles ω for both the tangential (left column) and sagittal (right column) image surfaces at a wavelength of 540 nm.

FIGS. 8A–8C show the spherical aberration (in mm), the astigmatism (in mm), and the distortion, respectively, of the zoom lens of Embodiment 3 at the telephoto end. FIG. 8D shows the coma of the zoom lens of Embodiment 3 at the telephoto end for various half-field angles ω for both the tangential (left column) and sagittal (right column) image surfaces at a wavelength of 540 nm. In FIGS. 7A and 8A, the spherical aberration is shown for the wavelengths 420 nm, 540 nm, and 680 nm. In FIGS. 7B, 7C, 8B, and 8C, ω is the half-field angle. In FIGS. 7B and 8B, the astigmatism is shown for the sagittal image surface S and the tangential image surface T. In FIGS. 7C and 8C, the distortion is measured at 540 nm. As is apparent from these figures, the various aberrations are favorably corrected over the entire range of zoom.

Figure 2:
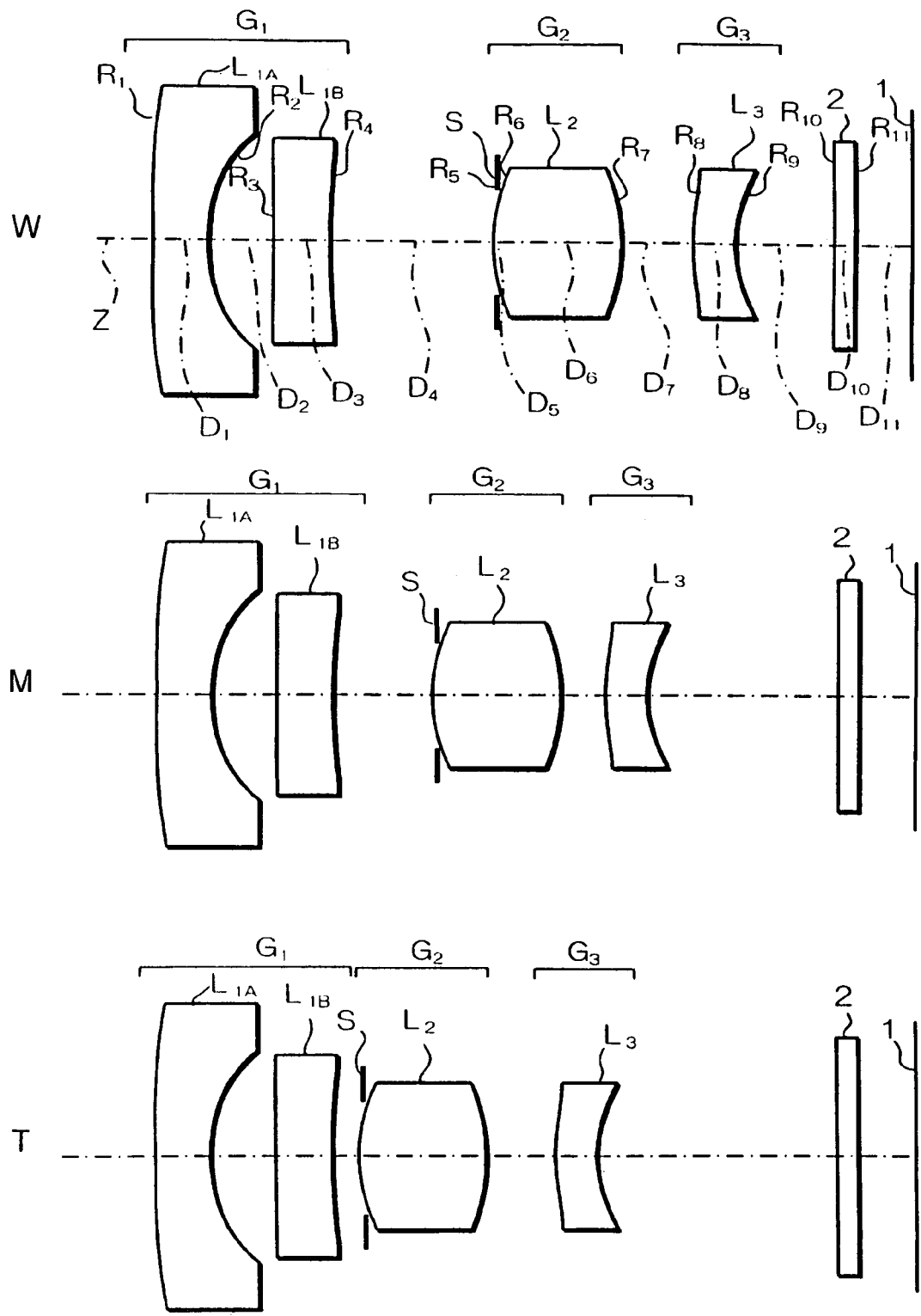
FIG. 2 shows a cross-sectional view of Embodiments 4 and 5 of the zoom lens of the present invention at the wide-angle end, at a middle position, and at the telephoto end.

Embodiments 4 and 5 of the present invention will now be described generally with reference to FIG. 2. In FIG. 2, lens components that are lens elements are referenced by the letter L with a Subscript denoting their order from the object side of the zoom lens along the optical axis Z, as $L_{1A}$, $L_{1B}$, $L_2$ and $L_3$. Thus, Embodiment 4 is a three-group four component zoom lens. Similarly, the radii of curvature of the optical surfaces are referenced by the letter R with a subscript denoting their order from the object side of the zoom lens, from $R_1$ to $R_{11}$. The on-axis surface spacings along the optical axis Z of the various optical surfaces are referenced by the letter D with a subscript denoting their order from the object side of the zoom lens, from $D_1$ to $D_{11}$. In the same manner, the three lens groups are labeled $G_1$ to $G_3$ in order from the object side of the zoom lens and the optical components belonging to each lens group are indicated by brackets adjacent the labels $G_1$ to $G_3$. Lens elements $L_{1A}$ and $L_{1B}$ have negative refractive power, lens element $L_2$ has positive refractive power, and lens element $L_3$ has negative refractive power.

Preferably, the lens element $L_2$ of the second lens group $G_2$ and the lens element $L_3$ of the third lens group $G_3$ are made of plastic and both lens surfaces of each of these lens elements are aspheric.

From top to bottom, FIG. 2 shows three settings of the zoom lens as the zoom lens performs zooming from a wide-angle end W, through a middle position M, to a telephoto end T by maintaining the first lens group $G_1$ stationary and moving the second lens group $G_2$ and the third lens group $G_3$ along the optical axis Z. Additionally, a plane-parallel plate 2, which is a cover glass or the like, is provided between the third lens group $G_3$ and the image plane 1, where, for example, a planar portion of a CCD image pickup element is positioned.

Embodiments 4 and 5 of the present invention are similar to Embodiment 1, but as described above, include two lens elements in the first lens group $G_1$ rather than a single lens element as in Embodiment 1.

The zoom lenses of Embodiments 4 and 5 satisfy Conditions (1)–(6) above. Additionally, the zoom lenses of Embodiments 4 and 5 satisfy the following Conditions (7) and (8):

$$0.28 < |f2/f3| < 0.56 \qquad \text{Condition (7)}$$

$$0.50 < |f1/f3| < 0.90 \qquad \text{Condition (8)}$$

where f2, f3, and f1 are as defined above.

The reasons for satisfying Conditions (1)–(3) have already been described above with regard to Embodiments 1–3. The reasons for satisfying Conditions (7) and (8) are the same as those described above for satisfying Conditions (4) and (5), respectively.

In addition, by having negative refractive power in the first lens group $G_1$ and the third lens group $G_3$, both ends of the zoom lens become of the telephoto type so that, during zooming, the principal points of the zoom lens move so that the overall length of the zoom lens can be made relatively short.

Positive Petzval sum and negative distortion are controlled by placing the lens element $L_3$, which has negative refractive power and forms the third lens group $G_3$, on the extreme image plane side of the zoom lens, and by placing the second lens group $G_2$, which has positive refractive power, on the image side of the stop S. With this arrangement, by focusing only by movement of lens element $L_3$, fluctuations of various aberrations that accompany focusing can be controlled better than focusing performed by moving the object-side lens group $G_1$. Additionally, because the first lens group $G_1$ is not moved for focusing, the peripheral light quantity during focusing at close range can be sufficiently maintained without enlarging the lens aperture.

When the fourth lens element $L_3$ that forms the third lens group $G_3$ is formed of a single plastic lens element that includes at least one aspheric surface, the following Condition (9) is preferably satisfied, as well as Condition (7):

$$0.35 < |f2/f3| < 0.50 \quad \text{Condition (9)}$$

where f2 and f3 are as defined above.

By satisfying Condition (9), the variation of refractive power of the zoom lens with zooming is more suitable, and an inner focus system advantageous for shortening the overall length of the zoom lens is more easily adopted.

Embodiments 4 and 5 of the present invention will now be individually described with further reference to the drawings.

Embodiment 4

In Embodiment 4, as shown in FIG. 2, the first lens group $G_1$ is formed of two lens elements, $L_{1A}$ and $L_{1B}$, each of negative refractive power. All four lens elements shown in FIG. 2 are made of plastic and two lens surfaces in each lens group are aspheric.

Table 13 below lists numerical values of lens data for Embodiment 4 based on the focal length of the three-group zoom lens being normalized to 100 mm at the wide-angle end. Table 13 lists the surface number #, in order from the object side, the radius of curvature R (in mm) of each surface near the optical axis, the on-axis surface spacing D (in mm) between surfaces, as well as the refractive index $N_e$ (at the e-line of λ=546.1 nm) and the Abbe number $v_d$ (at the d-line of 587.6 nm) of each lens element for Embodiment 4. Listed in the bottom portion of Table 13 are the zoom ratio ZR (i.e., the focal length at the telephoto end divided by the focal length at the wide-angle end), the maximum image angle 2ω at the wide-angle end, and the maximum total length MTL (defined as the longest distance from the most object-side lens surface to the image plane, when focused on an object at infinity, for any zoom position from the wide-angle end through the telephoto end) for Embodiment 4.

TABLE 13

| # | R | D | $N_e$ | $v_d$ |
|---|---|---|---|---|
| 1* | −778.11 | 29.36 | 1.51 | 56.3 |
| 2* | 109.10 | 34.67 | | |
| 3 | 8447.59 | 30.13 | 1.51 | 53.1 |
| 4 | 422.38 | $D_4$ (variable) | | |
| 5 | ∞ (stop) | −2.33 | | |
| 6* | 84.54 | 69.72 | 1.51 | 56.3 |
| 7* | −102.78 | $D_7$ (variable) | | |
| 8* | 118.04 | 22.29 | 1.59 | 30.3 |
| 9* | 60.30 | $D_9$ (variable) | | |
| 10 | ∞ | 11.26 | 1.52 | 64.1 |
| 11 | ∞ | | | |
| | ZR = 2.0 | 2ω = 74.4° | MTL = 411.61 mm | |

The surfaces with a * to the right of the surface number in Table 13 are aspheric lens surfaces, with the aspheric surface shape expressed by Equation (A) above.

Table 14 below lists the values of the constants K and $A_3$–$A_{10}$ used in Equation (A) above for each of the aspheric surfaces indicated in Table 13. Aspheric coefficients that are not present in Table 14 are zero. An "E" in the data indicates that the number following the "E" is the exponent to the base 10. For example, "1.0E-02" represents the number $1.0 \times 10^{-2}$.

TABLE 14

| # | K | $A_3$ | $A_4$ | $A_5$ | $A_6$ | $A_7$ | $A_8$ | $A_9$ | $A_{10}$ |
|---|---|---|---|---|---|---|---|---|---|
| 1 | 1.00000 | 0.22263E−4 | −0.46691E−7 | −0.13474E−9 | −0.17243E−11 | 0.12629E−14 | 0.37765E−17 | 0.35878E−20 | 0.13131E−22 |
| 2 | 1.00000 | 0.95603E−5 | 0.45913E−6 | 0.94316E−9 | −0.49806E−12 | 0.93479E−15 | 0.23479E−17 | 0.72134E−21 | 0.32530E−23 |
| 6 | 1.00000 | 0.16738E−5 | −0.38285E−6 | 0.30831E−11 | −0.62675E−12 | 0.39022E−20 | 0.73554E−17 | 0.29448E−25 | 0.34362E−25 |
| 7 | 1.00000 | −0.67567E−6 | 0.73144E−7 | −0.92387E−12 | 0.11436E−11 | −0.45110E−19 | 0.26337E−18 | −0.32543E−26 | 0.78871E−24 |
| 8 | 1.00000 | 0.34393E−5 | −0.14111E−5 | 0.20023E−10 | 0.40419E−12 | −0.12653E−14 | 0.56849E−18 | 0.27296E−21 | −0.29650E−25 |
| 9 | 1.00000 | −0.80165E−5 | −0.13068E−5 | −0.91210E−9 | 0.13340E−12 | 0.21436E−15 | 0.95775E−18 | −0.10526E−21 | 0.56785E−25 |

In the zoom lens of Embodiment 4, both the second lens group $G_2$ and the third lens group $G_3$ move during zooming. Therefore, the on-axis spacing $D_4$ between lens groups $G_1$ and $G_2$, the on-axis spacing $D_7$ between lens groups $G_2$ and $G_3$, and the on-axis spacing $D_9$ between the lens group $G_3$ and the plane-parallel plate 2 change with zooming. Table 15 below lists the values of the focal length f, the f-number $F_{NO}$, the on-axis surface spacing $D_4$, the on-axis surface spacing $D_7$, and the on-axis surface spacing $D_9$ at the wide-angle end (f=100 mm) and at the telephoto end (f=200 mm).

TABLE 15

| f | $F_{NO}$ | $D_4$ | $D_7$ | $D_9$ |
|---|---|---|---|---|
| 100 | 2.8 | 92.00 | 36.61 | 19.71 |
| 200 | 4.4 | 16.76 | 33.62 | 97.94 |

The zoom lens of Embodiment 4 of the present invention satisfies Conditions (1)–(9) above, as set forth in Table 16 below.

TABLE 16

| Condition No. | Condition | Value |
|---|---|---|
| (1) | 1.9 < ft/fw < 2.6 | 2.000 |
| (2) | 4.0 < MTL/fw < 5.3 | 4.116 |
| (3) | 0.7 < Bfw/fw < 1.3 | 0.953 |
| (4) | 0.25 < |f2/f3| < 0.70 | 0.425 |
| (5) | 0.20 < |f1/f3| < 1.60 | 0.592 |
| (6) | 1.70 < |f3/fw| < 4.20 | 2.477 |
| (7) | 0.28 < |f2/f3| < 0.56 | 0.425 |
| (8) | 0.50 < |f1/f3| < 0.90 | 0.592 |
| (9) | 0.35 < |f2/f3| < 0.50 | 0.425 |

Figure 9A:
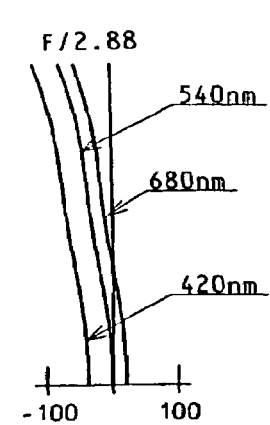
FIGS. 9A–9C show the spherical aberration, astigmatism, and distortion, respectively, of the zoom lens according to Embodiment 4 at the wide-angle end.
Figure 9B:
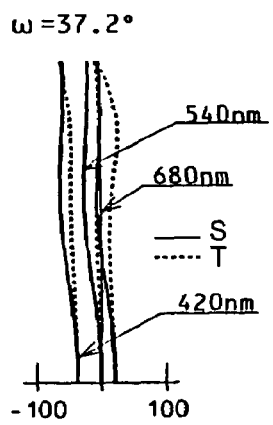
Figure 9C:
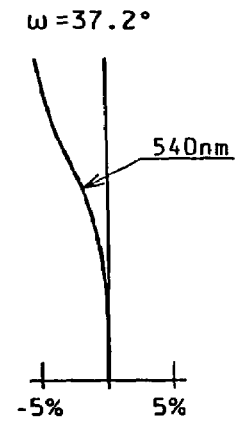
Figure 9D:
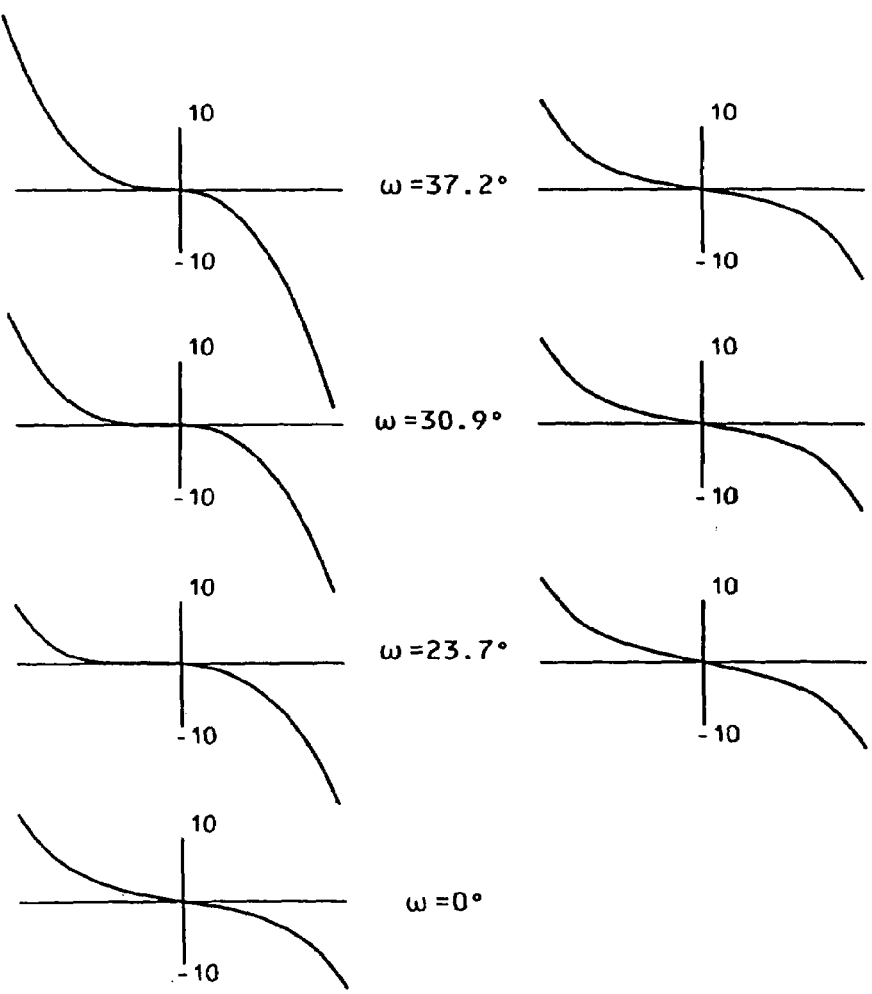
FIG. 9D shows the coma of the zoom lens according to Embodiment 4 at the wide-angle end.

FIGS. 9A–9C show the spherical aberration (in mm), the astigmatism (in mm), and the distortion, respectively, of the zoom lens of Embodiment 4 at the wide-angle end. FIG. 9D shows the coma of the zoom lens of Embodiment 4 at the wide-angle end for various half-field angles ω for both the tangential (left column) and sagittal (right column) image surfaces at a wavelength of 540 nm.

FIGS. 10A–10C show the spherical aberration (in mm), the astigmatism (in mm), and the distortion, respectively, of the zoom lens of Embodiment 4 at the telephoto end. FIG. 10D shows the coma of the zoom lens of Embodiment 4 at the telephoto end for various half-field angles ω for both the tangential (left column) and sagittal (right column) image surfaces at a wavelength of 540 nm. In FIGS. 9A and 10A, the spherical aberration is shown for the wavelengths 420 nm, 540 nm, and 680 nm. In FIGS. 9B, 9C, 10B, and 10C, ω is the half-field angle. In FIGS. 9B and 10B, the astigmatism is shown for the sagittal image surface S and the tangential image surface T. In FIGS. 9C and 10C, the distortion is measured at 540 nm. As is apparent from these figures, the various aberrations are favorably corrected over the entire range of zoom.

end. Table 17 lists the surface number #, in order from the object side, the radius of curvature R (in mm) of each surface near the optical axis, the on-axis surface spacing D (in mm) between surfaces, as well as the refractive index $N_e$ (at the e-line of λ=546.1 nm) and the Abbe number $v_d$ (at the d-line of 587.6 nm) of each lens element for Embodiment 5. Listed in the bottom portion of Table 17 are the zoom ratio ZR (i.e., the focal length at the telephoto end divided by the focal length at the wide-angle end), the maximum image angle 2ω at the wide-angle end, and the maximum total length MTL (defined as the longest distance from the most object-side lens surface to the image plane, when focused on an object at infinity, for any zoom position from the wide-angle end through the telephoto end) for Embodiment 5.

TABLE 17

| # | R | D | $N_e$ | $v_d$ |
|---|---|---|---|---|
| 1* | 63582.42 | 24.78 | 1.51 | 56.3 |
| 2* | 78.20 | 35.13 | | |
| 3 | −391.35 | 28.79 | 1.80 | 25.3 |
| 4 | −510.19 | $D_4$ (variable) | | |
| 5 | ∞ (stop) | −0.31 | | |
| 6* | 81.93 | 70.14 | 1.51 | 56.3 |
| 7* | −96.96 | $D_7$ (variable) | | |
| 8* | 133.38 | 24.03 | 1.59 | 30.3 |
| 9* | 55.35 | $D_9$ (variable) | | |
| 10 | ∞ | 10.81 | 1.52 | 64.1 |
| 11 | ∞ | | | |
| ZR = 2.0 | | 2ω = 67.8° | MTL = 411.61 mm | |

The surfaces with a * to the right of the surface number in Table 17 are aspheric lens surfaces, with the aspheric surface shape expressed by Equation (A) above.

Table 18 below lists the values of the constants K and $A_3$–$A_{10}$ used in Equation (A) above for each of the aspheric surfaces indicated in Table 17. Aspheric coefficients that are not present in Table 18 are zero. An "E" in the data indicates that the number following the "E" is the exponent to the base 10. For example, "1.0E-02" represents the number $1.0 \times 10^{-2}$.

TABLE 18

| # | K | $A_3$ | $A_4$ | $A_5$ | $A_6$ | $A_7$ | $A_8$ | $A_9$ | $A_{10}$ |
|---|---|---|---|---|---|---|---|---|---|
| 1 | 1.00000 | 0.24189E−4 | −0.52808E−7 | −0.15879E−9 | −0.21172E−11 | 0.16157E−14 | 0.50338E−17 | 0.49827E−20 | 0.19000E−22 |
| 2 | 1.00000 | 0.10373E−4 | 0.51931E−6 | 0.11115E−8 | −0.61154E−12 | 0.11959E−14 | 0.31296E−17 | 0.10018E−20 | 0.47071E−23 |
| 6 | 1.00000 | 0.17863E−5 | −0.43303E−6 | 0.36333E−11 | −0.76956E−12 | 0.49923E−20 | 0.98042E−17 | 0.40898E−25 | 0.49722E−25 |
| 7 | 1.00000 | −0.71052E−6 | 0.82732E−7 | −0.10887E−11 | 0.14042E−11 | −0.57711E−19 | 0.35105E−18 | −0.45196E−26 | 0.11413E−23 |
| 8 | 1.00000 | 0.37295E−5 | −0.15960E−5 | 0.23596E−10 | 0.49628E−12 | −0.16187E−14 | 0.75776E−18 | 0.37908E−21 | −0.42904E−25 |
| 9 | 1.00000 | −0.87057E−5 | −0.14781E−5 | −0.10749E−8 | 0.16379E−12 | 0.27424E−15 | 0.12766E−17 | −0.14619E−21 | 0.82169E−25 |

Embodiment 5

Embodiment 5 is very similar to Embodiment 4 and therefore only the differences between Embodiment 5 and Embodiment 4 will be explained. Embodiment 5 differs from Embodiment 4 in its lens element configuration by having different radii of curvature of the lens surfaces, different aspheric coefficients of the aspheric lens surfaces, and different optical element surface spacings.

Table 17 below lists numerical values of lens data for Embodiment 5 based on the focal length of the three-group zoom lens being normalized to 100 mm at the wide-angle In the zoom lens of Embodiment 5, both the second lens group $G_2$ and the third lens group $G_3$ move during zooming. Therefore, the on-axis spacing $D_4$ between lens groups $G_1$ and $G_2$, the on-axis spacing $D_7$ between lens groups $G_2$ and $G_3$, and the on-axis spacing $D_9$ between the lens group $G_3$ and the plane-parallel plate 2 change with zooming. Table 19 below lists the values of the focal length f, the f-number $F_{NO}$, and the variable on-axis surface spacings $D_4$, $D_7$, and $D_9$ at the wide-angle end (f=100 mm) and at the telephoto end (f=200 mm).

TABLE 19

| f | $F_{NO}$ | $D_4$ | $D_7$ | $D_9$ |
|---|---|---|---|---|
| 100 | 2.8 | 85.56 | 35.13 | 18.92 |
| 200 | 4.4 | 6.39 | 34.83 | 98.39 |

The zoom lens of Embodiment 5 of the present invention satisfies Conditions (1)–(9) above, as set forth in Table 20 below.

TABLE 20

| Condition No. | Condition | Value |
|---|---|---|
| (1) | 1.9 < ft/fw < 2.6 | 2.000 |
| (2) | 4.0 < MTL/fw < 5.3 | 4.116 |
| (3) | 0.7 < Bfw/fw < 1.3 | 0.910 |
| (4) | 0.25 < |f2/f3| < 0.70 | 0.402 |
| (5) | 0.20 < |f1/f3| < 1.60 | 0.801 |
| (6) | 1.70 < |f3/fw| < 4.20 | 1.816 |
| (7) | 0.28 < |f2/f3| < 0.56 | 0.402 |
| (8) | 0.50 < |f1/f3| < 0.90 | 0.801 |
| (9) | 0.35 < |f2/f3| < 0.50 | 0.402 |

FIGS. 11A–11C show the spherical aberration (in mm), the astigmatism (in mm), and the distortion, respectively, of the zoom lens of Embodiment 5 at the wide-angle end. FIG. 11D shows the coma of the zoom lens of Embodiment 5 at the wide-angle end for various half-field angles ω for both the tangential (left column) and sagittal (right column) image surfaces at a wavelength of 540 nm.

FIGS. 12A–12C show the spherical aberration (in mm), the astigmatism (in mm), and the distortion, respectively, of the zoom lens of Embodiment 5 at the telephoto end. FIG. 12D shows the coma of the zoom lens of Embodiment 5 at the telephoto end for various half-field angles ω for both the tangential (left column) and sagittal (right column) image surfaces at a wavelength of 540 nm. In FIGS. 11A and 12A, the spherical aberration is shown for the wavelengths 420 nm, 540 nm, and 680 nm. In FIGS. 11B, 11C, 12B, and 12C, ω is the half-field angle. In FIGS. 11B and 12B, the astigmatism is shown for the sagittal image surface S and the tangential image surface T. In FIGS. 11C and 12C, the distortion is measured at 540 nm. As is apparent from these figures, the various aberrations are favorably corrected over the entire range of zoom.

The present invention is not limited to the aforementioned embodiments, as it will be immediately apparent that various alternative implementations are possible. For instance, values such as the radius of curvature R of each of the lens components, the shapes of the aspheric lens surfaces, the surface spacings D, the refractive index $N_e$, and Abbe number $v_d$ of the lens elements are not limited to those indicated in each of the aforementioned embodiments, as other values can be adopted. Such variations are not to be regarded as a departure from the spirit and scope of the present invention. Rather, the scope of the present invention shall be defined as set forth in the following claims and their legal equivalents. All such modifications as would be obvious to one skilled in the art are intended to be included within the scope of the following claims.

What is claimed is:

1. A zoom lens comprising, arranged along an optical axis in order from the object side:
    a first lens group having negative refractive power and that includes only one or two lens components;
    a second lens group having positive refractive power and that includes only one lens component;
    a third lens group having negative refractive power and that includes only one lens component;
wherein
    the second lens group and the third lens group move along the optical axis during zooming; and
    the following conditions are satisfied:

$1.9 < ft/fw < 2.6$ $4.0 < MTL/fw < 5.3$ $0.7 < Bfw/fw < 1.3$ where
    ft is the focal length of the zoom lens at the telephoto end,
    fw is the focal length of the zoom lens at the wide-angle end,
    MTL is the longest distance from the most object-side lens surface to the image plane, when focused on an object at infinity, for any zoom position from the wide-angle end through the telephoto end, and
    Bfw is the back focal length of the zoom lens at the wide-angle end.

2. The zoom lens of claim 1, wherein the first lens group includes only one lens component and the one lens component of the first lens group is formed so that the positive refractive power of its object-side lens surface becomes stronger toward the periphery and so that the negative refractive power of its image-side lens surface becomes stronger toward the periphery.

3. The zoom lens of claim 2, wherein the first lens group includes only one lens component and the following condition is satisfied:

$0.25 < |f2/f3| < 0.70$ where
    f2 is the focal length of the second lens group, and
    f3 is the focal length of the third lens group.

4. The zoom lens of claim 1, wherein the first lens group includes only one lens component and the following condition is satisfied:

$0.20 < |f1/f3| < 1.60$ where
    f1 is the focal length of the first lens group, and
    f3 is the focal length of the third lens group.

5. The zoom lens of claim 1, wherein:
    focusing is performed by movement of the third lens group along the optical axis;
    the second lens group includes a stop on its object side; and
    the following condition is satisfied:

$1.70 < |f3/fw| < 4.20$ where
    f3 is the focal length of the third lens group.

6. The zoom lens of claim 1, wherein the first lens group includes only two lens components and the following condition is satisfied:

$0.28 < |f2/f3| < 0.56$ where
  f2 is the focal length of the second lens group, and
  f3 is the focal length of the third lens group.

7. The zoom lens of claim 1, wherein the first lens group includes only two lens components and the following condition is satisfied:

$$0.50 < |f1/f3| < 0.90$$

where
  f1 is the focal length of the first lens group, and
  f3 is the focal length of the third lens group.

8. The zoom lens of claim 6, wherein the third lens group includes only one lens component that is made of plastic and has at least one aspheric surface, and the following condition is satisfied:

$$0.35 < |f2/f3| < 0.50.$$

9. The zoom lens of claim 1, wherein the lens elements of each of the first and second lens groups are made of plastic and the object side surface and the image side surface of each of the first and second lens groups are aspheric.

10. The zoom lens of claim 1, wherein the first lens group, the second lens group, and the third lens group are arranged in that order along the optical axis from the object side without any intervening lens element.

11. The zoom lens of claim 10, wherein each lens component of each of the first, second, and third lens groups includes only one lens element.

12. The zoom lens of claim 1, wherein each lens component of each of the first, second, and third lens groups includes only one lens element.

13. The zoom lens of claim 2, wherein the first lens group, the second lens group, and the third lens group are arranged in that order along the optical axis from the object side without any intervening lens element.

14. The zoom lens of claim 13, wherein each lens component of each of the first, second, and third lens groups includes only one lens element.

15. The zoom lens of claim 2, wherein each lens component of each of the first, second, and third lens groups includes only one lens element.

16. The zoom lens of claim 6, wherein the first lens group, the second lens group, and the third lens group are arranged in that order along the optical axis from the object side without any intervening lens element.

17. The zoom lens of claim 16, wherein each lens component of each of the first, second, and third lens groups includes only one lens element.

18. The zoom lens of claim 6, wherein each lens component of each of the first, second, and third lens groups includes only one lens element.

19. The zoom lens of claim 7, wherein the first lens group, the second lens group, and the third lens group are arranged in that order along the optical axis from the object side without any intervening lens element.

20. The zoom lens of claim 19, wherein each lens component of each of the first, second, and third lens groups includes only one lens element.

* * * * *

UNITED STATES PATENT AND TRADEMARK OFFICE
CERTIFICATE OF CORRECTION

PATENT NO. : 6,995,923 B2
DATED : February 7, 2006
INVENTOR(S) : Noda

It is certified that error appears in the above-identified patent and that said Letters Patent is hereby corrected as shown below:

Column 3,
Line 9, change "$L_{1 \text{ to } L3}$." to -- $L_1$ to $L_3$. --;

Column 5,
Lines 7-9, change Conditions (4) and (5) to:
  -- $0.25 < |f2/f3| < 0.70$     ... Condition (4)
     $0.20 < |f1/f3| < 1.60$     ... Condition (5) --;

Column 12,
Line 13, change "Subscript" to -- subscript --; and
Lines 57-59, change Conditions (7) and (8) to:
  -- $0.28 < |f2/f3| < 0.56$     ... Condition (7)
     $0.50 < |f1/f3| < 0.90$     ... Condition (8) --.

Signed and Sealed this

Sixth Day of June, 2006

JON W. DUDAS
*Director of the United States Patent and Trademark Office*